US008743981B2

(12) United States Patent
Zhang

(10) Patent No.: US 8,743,981 B2
(45) Date of Patent: Jun. 3, 2014

(54) MODULATION METHOD AND APPARATUS

(75) Inventor: Wurong Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 13/327,376

(22) Filed: Dec. 15, 2011

(65) Prior Publication Data

US 2012/0087439 A1    Apr. 12, 2012

Related U.S. Application Data

(63) Continuation of application No. PCT/CN2010/073859, filed on Jun. 12, 2010.

(30) Foreign Application Priority Data

Jun. 16, 2009 (CN) .......................... 2009 1 0203781

(51) Int. Cl.
*H04L 27/28* (2006.01)
(52) U.S. Cl.
USPC .......................................... 375/260; 375/295
(58) Field of Classification Search
CPC ..... H04L 5/0007; H04L 5/001; H04L 5/0053; H04W 72/0453; H04W 48/16; H04B 7/0413
USPC ................................................. 375/260, 295
See application file for complete search history.

(56) References Cited

U.S. PATENT DOCUMENTS

| 6,615,043 | B1* | 9/2003 | van de Berg | ................... 455/434 |
| 2004/0264431 | A1 | 12/2004 | Rhodes | |
| 2006/0035382 | A1 | 2/2006 | Shinozaki et al. | |
| 2009/0257517 | A1* | 10/2009 | Nordstrom et al. | ........... 375/260 |
| 2010/0172235 | A1* | 7/2010 | Liu et al. | ....................... 370/208 |
| 2011/0135016 | A1* | 6/2011 | Ahn et al. | ...................... 375/259 |
| 2011/0211489 | A1* | 9/2011 | Chung et al. | .................. 370/252 |

FOREIGN PATENT DOCUMENTS

| CN | 1697441 A | 11/2005 |
| CN | 1780158 A | 5/2006 |
| CN | 1810004 A | 7/2006 |

(Continued)

OTHER PUBLICATIONS

International Search Report and Translation received in Patent Cooperation Treaty Application No. PCT/CN2010/073859, mailed Sep. 16, 2010, 8 pages.

(Continued)

*Primary Examiner* — Shuwang Liu
*Assistant Examiner* — David S Huang
(74) *Attorney, Agent, or Firm* — Slater & Matsil, L.L.P

(57) ABSTRACT

Embodiments of the present invention disclose a modulation method and apparatus. The modulation method includes: processing at least two data blocks, and outputting at least two single-carrier Orthogonal Frequency Division Multiplex (OFDM) signals, where the at least two data blocks include a first data block and a second data block, the at least two single-carrier OFDM signals include a first single-carrier OFDM signal corresponding to the first data block and a second single-carrier OFDM signal corresponding to the second data block, a difference between a carrier center frequency RF1 of the first single-carrier OFDM signal and a carrier center frequency RF2 of the second single-carrier OFDM signal is an integral multiple of an F0, and the F0 is a subcarrier bandwidth; and transmitting the at least two single-carrier OFDM signals.

19 Claims, 11 Drawing Sheets

(56) References Cited

FOREIGN PATENT DOCUMENTS

| CN | 1941762 A | 4/2007 |
|---|---|---|
| CN | 101572683 A | 11/2009 |
| CN | 101924729 A | 12/2010 |
| EP | 1469613 A1 | 10/2004 |

OTHER PUBLICATIONS

Written Opinion of the International Searching Authority and Translation received in Patent Cooperation Treaty Application No. PCT/CN2010/073859, mailed Sep. 16, 2010, 10 pages.
European Search Report received in European Patent Office Application No. 10788907.3-1525, Applicant Huawei Technologies Co., Ltd., mailed Nov. 26, 2012, 6 pages.
"Scenarios and Assumptions for Carrier Aggregation in LTE Advanced", 3GPP TSG-RAN WG4 Meeting #50, R4-090594, Athens, Greece, Feb. 9-13, 2009, 4 pages.
"Proposals for contiguous carrier aggregation", 3GPP TSG RAN WG4 Meeting #50bis, R4-091150, Seoul, Korea, Mar. 23-27, 2009, 4 pages.
"Simulation results for contiguous carrier-aggregation", 3GPP TSG RAN WG4 Meeting #50bis, R4-091151, Seoul, Korea, Mar. 23-27, 2009, 6 pages.
Roessler, A., et al.,"Carrier Aggregation—(one) Key Enabler for LTE-Advanced," Online brochure. Rohde & Schwarz, Muehldorfstrasse 15, Munich, Oct. 2012, 12 pages.
Communication pursuant to Article 94(3) EPC received in European Application No. 10 788 907.3 dated Nov. 7, 2013, 6 pages.
"LS on Support for Wider Bandwidths in LTE-Advanced," R1-084707, 3GPP TSG RAN WG1 Meeting #55, Prague, Czech Republic, Nov. 10-14, 2008, 2 pages.
Schulze, Henrik and Christian Luders. Page 163 "Theory and Applications of OFDM and CDMA; Wideband Wireless Communications," West Sussex: John Wiley and Sons Ltd., 2005. Print. 4 pages.

\* cited by examiner

MODULATION METHOD AND APPARATUS

CROSS-REFERENCE TO RELATED APPLICATIONS

This application is a continuation of International Application No. PCT/CN2010/073859, filed on Jun. 12, 2010, which claims priority to Chinese Patent Application No. 200910203781.3, filed on Jun. 16, 2009, both of which are hereby incorporated by reference in their entireties.

FIELD OF THE INVENTION

The present invention relates to the field of mobile communication technologies, and in particular, to a modulation method and a modulation apparatus for implementing the method.

BACKGROUND OF THE INVENTION

To improve a communication rate, a signal bandwidth that needs to be supported by a modern communication system becomes wider and wider. For example, a maximum bandwidth supported in a Long Term Evolution (LTE, Long Term Evolution) system is 20 MHz, and a Long Term Evolution-Advanced (LTE-A, Long Term Evolution-Advanced) system needs to support a signal with a maximum bandwidth of 100 MHz. Therefore, in the LTE-A system, multiple LTE carriers need to be aggregated together through various technical means to form a multi-carrier Orthogonal Frequency Division Multiplex (OFDM, Orthogonal Frequency Division Multiplex) signal with a wider bandwidth.

A modulation method in the prior art mainly includes: performing a Fast Fourier Transformation (FFT, Fast Fourier Transformation) on a data block that needs to be modulated, outputting a multi-carrier OFDM signal, where corresponding guard bands exist between adjacent single-carrier OFDM signals in the output multi-carrier OFDM signal, and performing frequency conversion on the multi-carrier OFDM signal; and transmitting the multi-carrier OFDM signal after frequency conversion.

In the prior art, a guard bandwidth is set between adjacent single-carrier OFDM signals in the multi-carrier OFDM signal, which may avoid interference between adjacent single-carrier OFDM signals. However, setting the guard bands between adjacent single-carrier OFDM signals cause the entire multi-carrier OFDM signal to require a larger guard bandwidth.

SUMMARY OF THE INVENTION

Embodiments of the present invention provide a modulation method and a modulation apparatus, which may decrease a guard bandwidth between adjacent single-carrier OFDM signals and increase spectrum utilization.

An embodiment of the present invention provides a modulation method, including: processing at least two data blocks, and outputting at least two single-carrier OFDM signals, where the at least two data blocks include a first data block and a second data block, the at least two single-carrier OFDM signals include a first single-carrier OFDM signal corresponding to the first data block and a second single-carrier OFDM signal corresponding to the second data block, a difference between a carrier center frequency RF1 of the first single-carrier OFDM signal and a carrier center frequency RF2 of the second single-carrier OFDM signal is an integral multiple of an F0, and the F0 is a subcarrier bandwidth; and transmitting the at least two single-carrier OFDM signals.

An embodiment of the present invention also provides a modulation apparatus, including: a data processing unit, configured to process at least two data blocks, and output at least two single-carrier OFDM signals, where the at least two data blocks include a first data block and a second data block, the at least two single-carrier OFDM signals include a first single-carrier OFDM signal corresponding to the first data block and a second single-carrier OFDM signal corresponding to the second data block, a difference between a carrier center frequency RF1 of the first single-carrier OFDM signal and a carrier center frequency RF2 of the second single-carrier OFDM signal is an integral multiple of an F0, and the F0 is a subcarrier bandwidth; and a transmitting unit, configured to transmit the at least two single-carrier OFDM signals output by the data processing unit.

In the embodiments of the present invention, because the difference between the carrier center frequency RF1 of the first single-carrier OFDM signal and the carrier center frequency RF2 of the second single-carrier OFDM signal is an integral multiple of the subcarrier bandwidth F0, which may ensure mutual orthogonality between the first single-carrier OFDM signal and the second single-carrier OFDM signal, guard bands between multiple channels of OFDM signals may be canceled. Compared with the prior art, the embodiments of the present invention may effectively decrease the guard bandwidth between adjacent single-carrier OFDM signals according to an orthogonal relationship between the first channel of OFDM signal and the second channel of OFDM signal, increase the spectrum utilization relatively, and save spectrum resources.

BRIEF DESCRIPTION OF THE DRAWINGS

To make the technical solutions according to the embodiments of the present invention clearer, accompanying drawings required for illustrating the embodiments of the present invention are briefly described in the following. Evidently, the accompanying drawings in the following description are only some embodiments of the present invention, and persons of ordinary skill in the art may further obtain other drawings from these accompanying drawings without creative efforts.

DETAILED DESCRIPTION OF THE EMBODIMENTS

The present invention provides a modulation method and a modulation apparatus for implementing the method. To help better understand the technical solutions of the present invention, the following describes the embodiments of the present invention in detail with reference to the accompanying drawings.

Figure 1:
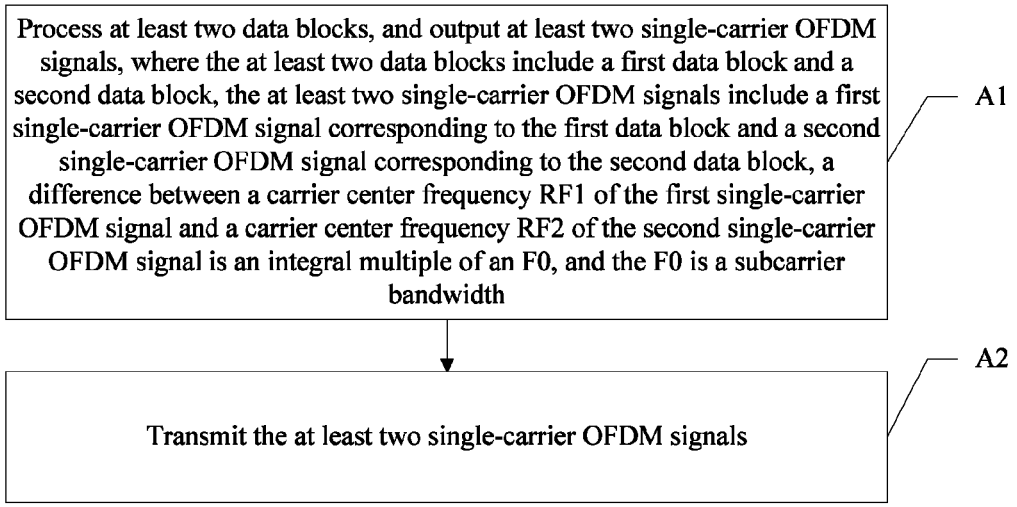
FIG. 1 is a basic flowchart of a modulation method according to an embodiment of the present invention.

Referring to FIG. 1, FIG. 1 is a basic flowchart of a modulation method according to an embodiment of the present invention.

Step A1: Process at least two data blocks, and output at least two single-carrier OFDM signals, where the at least two data blocks include a first data block and a second data block, the at least two single-carrier OFDM signals include a first single-carrier OFDM signal corresponding to the first data block and a second single-carrier OFDM signal corresponding to the second data block, a difference between a carrier center frequency RF1 of the first single-carrier OFDM signal and a carrier center frequency RF2 of the second single-carrier OFDM signal is an integral multiple of an F0, and the F0 is a subcarrier bandwidth.

In the embodiment of the present invention, at least two data blocks may be processed, and at least two single-carrier OFDM signals are output, where the at least two single-carrier OFDM signals include a first single-carrier OFDM signal corresponding to the first data block and a second single-carrier OFDM signal corresponding to the second data block, the difference between the carrier center frequency RF1 of the first single-carrier OFDM signal and the carrier center frequency RF2 of the second single-carrier OFDM signal is an integral multiple of an F0, and the F0 is a subcarrier bandwidth of a system, for example, the F0 may be 15 KHz in the embodiment of the present invention.

The at least two single-carrier OFDM signals output in the embodiment of the present invention may be a single channel of a multi-carrier OFDM signal that includes at least two single-carrier OFDM signals, and in this case, the multiple single-carrier OFDM signals form a channel of a multi-carrier OFDM signal. The foregoing at least two single-carrier OFDM signals may also be at least two channels of single-carrier OFDM signals, and in this case, each single-carrier OFDM signal is output in the form of a single channel of a signal. Both the multi-carrier OFDM signal and the single-carrier OFDM signal include multiple subcarriers, and an orthogonal relationship is kept between adjacent subcarriers.

Step A2: Transmit the at least two single-carrier OFDM signals.

In the embodiment of the present invention, because the difference between the carrier center frequency RF1 of the first single-carrier OFDM signal and the carrier center frequency RF2 of the second single-carrier OFDM signal is an integral multiple of the F0, which may ensure mutual orthogonality between the first single-carrier OFDM signal and the second single-carrier OFDM signal, a guard band between the first single-carrier OFDM signal and the second single-carrier OFDM signal may be canceled. Compared with the prior art, the embodiment of the present invention may effectively decrease a guard bandwidth between adjacent single-carrier OFDM signals according to the orthogonal relationship between the first single-carrier OFDM signal and the second single-carrier OFDM signal, increase spectrum utilization, and save spectrum resources.

In the embodiment of the present invention, the difference between the carrier center frequency RF1 of the first single-carrier OFDM signal and the carrier center frequency RF2 of the second single-carrier OFDM signal is an integral multiple of an MF, where the MF is a lowest common multiple of the subcarrier bandwidth F0 and a lowest resolution F1 of the carrier center frequency, for example, the F0 may be 15 KHz, the F1 may be 100 KHz or 1 Hz, and the MF may be 300 KHz or 15 KHz.

In the embodiment of the present invention, the difference between the RF1 and the RF2 is an integral multiple of the F1, and it may also be ensured that the RF1 and the RF2 are placed on frequency grids of a system to send the first single-carrier OFDM signal and the second single-carrier OFDM signal, where the system may be, for example, a Long Term Evolution system or a Long Term Evolution-Advanced system, or may also be another system.

Figure 2:
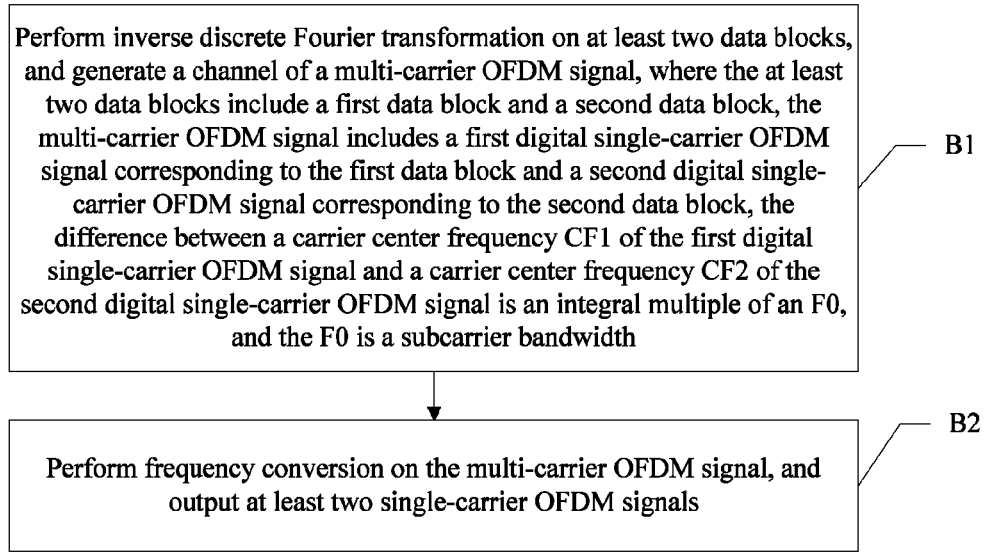
FIG. 2 is a flowchart of a first embodiment of a method for processing at least two data blocks according to an embodiment of the present invention.

Referred to FIG. 2, FIG. 2 is a flowchart of a first embodiment of a method for processing at least two data blocks according to an embodiment of the present invention. In the embodiment of the present invention, the foregoing step of processing at least two data blocks and outputting at least two single-carrier OFDM signals may include:

Step B1: Perform an inverse discrete Fourier transformation on at least two data blocks, and generate a channel of a multi-carrier OFDM signal, where the at least two data blocks include a first data block and a second data block, the multi-carrier OFDM signal includes a first digital single-carrier OFDM signal corresponding to the first data block and a second digital single-carrier OFDM signal corresponding to the second data block, the difference between a carrier center frequency CF1 of the first digital single-carrier OFDM signal and a carrier center frequency CF2 of the second digital single-carrier OFDM signal is an integral multiple of an F0, and the F0 is a subcarrier bandwidth.

In the embodiment of the present invention, the inverse discrete Fourier transformation may be performed on at least two data blocks, and zeros are inserted between the first data block and the second data block when the inverse discrete Fourier transformation is performed, so as to realize that the difference between the carrier center frequency CF1 of the first digital single-carrier OFDM signal in the generated multi-carrier OFDM signal and the carrier center frequency CF2 of the second digital single-carrier OFDM signal in the generated multi-carrier OFDM signal is an integral multiple of the F0, where the number of zeros may be calculated and obtained according to the bandwidth L1 of the first digital single-carrier OFDM signal, the bandwidth L2 of the second digital single-carrier OFDM signal, and the subcarrier bandwidth F0, for example, the F0 may be 15 KHz in the embodiment of the present invention.

In the embodiment of the present invention, the numbers of data bits in the first data block and the second data block may be set, so that the difference between the carrier center frequency CF1 of the first digital single-carrier OFDM signal in the generated multi-carrier OFDM signal and the carrier center frequency CF2 of the second digital single-carrier OFDM signal in the generated multi-carrier OFDM signal is an integral multiple of the F0.

Step B2: Perform frequency conversion processing on the multi-carrier OFDM signal, and output at least two single-carrier OFDM signals.

In the embodiment of the present invention, the frequency conversion processing may be performed on the multi-carrier OFDM signal generated after the inverse discrete Fourier transformation, and the output at least two single-carrier OFDM signals include a first single-carrier OFDM signal and a second single-carrier OFDM signal, where the carrier center frequency of the first single-carrier OFDM signal is an RF1, the carrier center frequency of the second single-carrier OFDM signal is an RF2, and the difference between the RF2 and the RF1 is an integral multiple of the F0. It should be noted that the at least two single-carrier OFDM signals output in the embodiment of the present invention may be a single channel of a multi-carrier OFDM signal that includes at least two single-carrier OFDM signals, and in this case, the multiple single-carrier OFDM signals form a channel of a multi-carrier OFDM signal. The at least two single-carrier OFDM signals may also be at least two channels of single-carrier OFDM signals, and in this case, each single-carrier OFDM signal is output in the form of a single channel of a signal.

In the embodiment of the present invention, the difference between the carrier center frequency CF1 of the first digital single-carrier OFDM signal in the multi-carrier OFDM signal and the carrier center frequency CF2 of the second digital single-carrier OFDM signal in the multi-carrier OFDM signal may be an integral multiple of an MF, where the MF is a lowest common multiple of the subcarrier bandwidth F0 and a lowest resolution F1 of the carrier center frequency, for example, the F0 may be 15 KHz, the F1 may be 100 KHz or 1 Hz, and the MF may be 300 KHz or 15 KHz in the embodiment of the present invention. According to the embodiment of the present invention, the difference between the carrier center frequency RF1 of the first single-carrier OFDM signal after frequency conversion processing and the carrier center frequency RF2 of the second single-carrier OFDM signal after frequency conversion processing may be an integral multiple of the F1, that is, the RF1 and the RF2 may be placed on frequency grids of a system.

Figure 3:
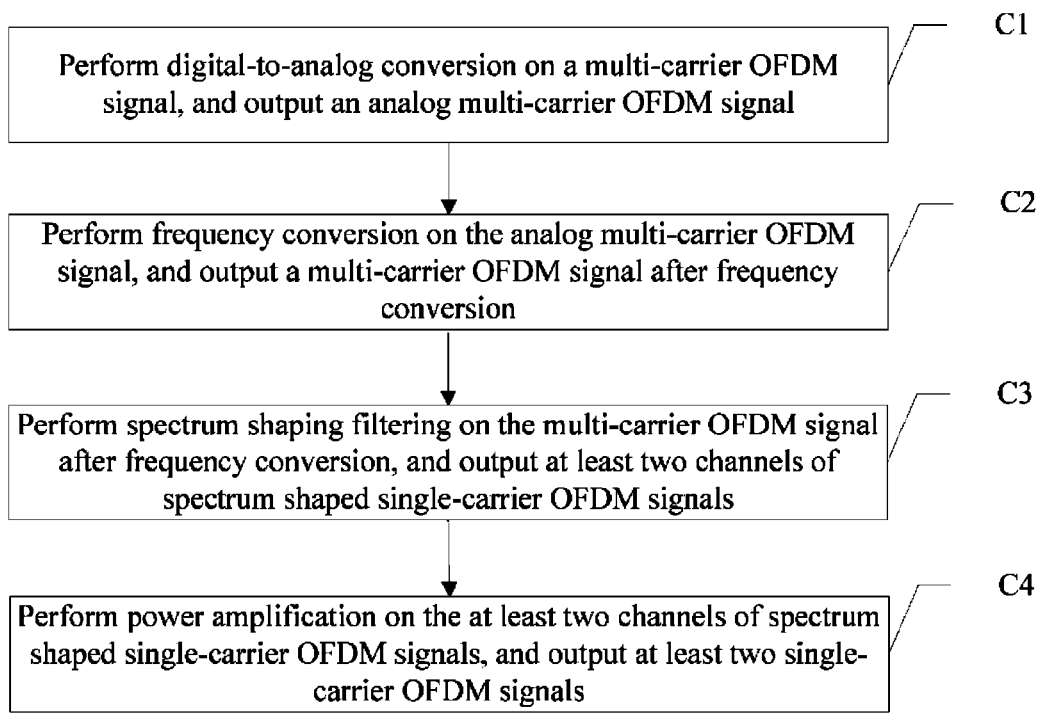
FIG. 3 is a flowchart of a first embodiment of a method for performing frequency conversion processing on a multi-carrier OFDM signal according to an embodiment of the present invention.

Referring to FIG. 3, FIG. 3 is a flowchart of a first embodiment of a method for performing frequency conversion processing on a multi-carrier OFDM signal according to an embodiment of the present invention. In the embodiment of the present invention, the performing frequency conversion processing on a multi-carrier OFDM signal and outputting at least two single-carrier OFDM signals may include the following steps:

Step C1: Perform digital-to-analog conversion on the multi-carrier OFDM signal, and output an analog multi-carrier OFDM signal.

In the embodiment of the present invention, a digital-to-analog converter may be used to perform the digital-to-analog conversion on the multi-carrier OFDM signal generated through an inverse discrete Fourier transformation and output the analog multi-carrier OFDM signal.

Step C2: Perform frequency conversion on the analog multi-carrier OFDM signal, and output a multi-carrier OFDM signal after frequency conversion.

In the embodiment of the present invention, frequency up-conversion may be performed on the analog multi-carrier OFDM signal and a multi-carrier OFDM signal after frequency conversion is output. The multi-carrier OFDM signal after frequency conversion includes a first single-carrier OFDM signal after frequency conversion and a second single-carrier OFDM signal after frequency conversion, where the carrier center frequency of the first single-carrier OFDM signal after frequency conversion is an RF1, the carrier center frequency of the second single-carrier OFDM signal after frequency conversion is an RF2, and the difference between the RF2 and the RF1 is an integral multiple of an F0.

Step C3: Perform analog spectrum shaping filtering on the multi-carrier OFDM signal after frequency conversion and output at least two channels of spectrum shaped single-carrier OFDM signals.

In the embodiment of the present invention, at least two analog filters are used to perform the analog spectrum shaping filtering on the multi-carrier OFDM signal after frequency conversion, that is, the analog spectrum shaping filtering is respectively performed on the first single-carrier OFDM signal after frequency conversion and the second single-carrier OFDM signal after frequency conversion that are in the multi-carrier OFDM signal after frequency conversion, and at least two channels of spectrum shaped single-carrier OFDM signals are output, where the at least two channels of spectrum shaped single-carrier OFDM signals include a first channel of a spectrum shaped single-carrier OFDM signal and a second channel of a spectrum shaped single-carrier OFDM signal. According to the embodiment of the present invention, out-of-band radiation of each single-carrier OFDM signal in the multi-carrier OFDM signal may be filtered out, interference between single-carrier OFDM signals may be decreased, and spectrum utilization may be increased.

Step C4: Perform power amplification on the at least two channels of spectrum shaped single-carrier OFDM signals and output at least two single-carrier OFDM signals.

In the embodiment of the present invention, each channel of a spectrum shaped single-carrier OFDM signal generated after spectrum shaping is a narrow-band OFDM signal, the bandwidth of which satisfies a bandwidth requirement of power amplification. Therefore, according to the embodiment of the present invention, a digital pre-distortion technology may be used to perform power amplification to improve amplification efficiency of power amplification, and output at least two single-carrier OFDM signals. It should be noted that the at least two single-carrier OFDM signals output in the embodiment of the present invention may be a single channel of a multi-carrier OFDM signal that includes at least two single-carrier OFDM signals, and in this case, the multiple single-carrier OFDM signals form a channel of a multi-carrier OFDM signal. The at least two single-carrier OFDM signals may also be at least two channels of single-carrier OFDM signals, and in this case, each single-carrier OFDM signal is output in the form of a single channel of a signal.

In the embodiment of the present invention, the multi-carrier OFDM signal after frequency conversion includes a first single-carrier OFDM signal after frequency conversion, a second single-carrier OFDM signal after frequency conversion, and a third single-carrier OFDM signal after frequency conversion, where the carrier center frequencies of the first, second, and third single-carrier OFDM signals after frequency conversion are the RF1, the RF2, and an RF3 respectively, the RF2 is greater than the RF1 but less than the RF3, the difference between the RF1 and the RF2 is an integral multiple of the F0, the F0 is a subcarrier bandwidth, and the RF1 is less than the carrier center frequency of any other single-carrier OFDM signal after frequency conversion in the multi-carrier OFDM signal after frequency conversion. A transition band during performing analog spectrum shaping filtering on the first single-carrier OFDM signal after frequency conversion is a W1, and a transition band during performing analog spectrum shaping filtering on the second single-carrier OFDM signal after frequency conversion is a W2, where the W2 is greater than the W1. In the embodiment of the present invention, a orthogonal relationship among the first single-carrier OFDM signal after frequency conversion, the second single-carrier OFDM signal after frequency conversion, and the third single-carrier OFDM signal after frequency conversion may be used so that the transition band W2 during performing analog spectrum shaping filtering on the second single-carrier OFDM signal after frequency conversion is greater than the W1. From the perspective of the frequency domain, the spectrum of the first single-carrier OFDM signal after frequency conversion is located at the left edge of the spectrum of the multi-carrier OFDM signal after frequency conversion, and the spectrum of the second single-carrier OFDM signal after frequency conversion is located at the center part of the spectrum of the multi-carrier OFDM signal after frequency conversion. Therefore, during the design of an analog spectrum shaping filter, a filter corresponding to the second single-carrier OFDM signal after frequency conversion may have a wider transition band relatively, and especially in the case that the multi-carrier OFDM signal after frequency conversion includes multiple single-carrier OFDM signals after frequency conversion in a system, multiple single-carrier OFDM signals after frequency conversion located at the signal spectrum center may have a wider transition band during the spectrum shaping filtering relative to the two single-carrier OFDM signals after frequency conversion at the signal spectrum edge, which may decrease implementation complexity of the filter.

Figure 4:
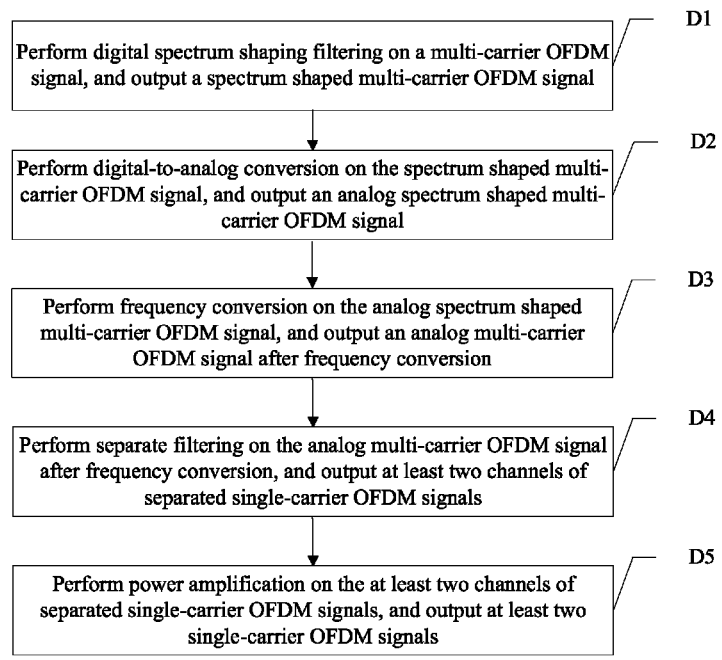
FIG. 4 is a flowchart of a second embodiment of a method for performing frequency conversion processing on a multi-carrier OFDM signal according to an embodiment of the present invention.

Referring to FIG. 4, FIG. 4 is a flowchart of a second embodiment of a method for performing frequency conversion processing on a multi-carrier OFDM signal according to an embodiment of the present invention. In the embodiment of the present invention, the performing frequency conversion processing on a multi-carrier OFDM signal and outputting at least two single-carrier OFDM signals may include the following steps:

Step D1: Perform digital spectrum shaping filtering on the multi-carrier OFDM signal, and output a spectrum shaped multi-carrier OFDM signal.

In the embodiment of the present invention, digital spectrum shaping filtering is performed on the multi-carrier OFDM signal (as one signal) that is generated after inverse discrete Fourier transformation to filter out out-of-band radiation of the multi-carrier OFDM signal and output a spectrum shaped multi-carrier OFDM signal, which may decrease the interference from the multi-carrier OFDM signal on the system.

Step D2: Perform digital-to-analog conversion on the spectrum shaped multi-carrier OFDM signal, and output an analog spectrum shaped multi-carrier OFDM signal.

In the embodiment of the present invention, a digital-to-analog converter may be used to perform digital-to-analog conversion on the spectrum shaped multi-carrier OFDM signal and output an analog spectrum shaped multi-carrier OFDM signal.

Step D3: Convert the analog spectrum shaped multi-carrier OFDM signal, and output a converted analog multi-carrier OFDM signal.

In the embodiment of the present invention, the analog spectrum shaped multi-carrier OFDM signal may be up-converted and a converted analog multi-carrier OFDM signal is output, where the converted analog multi-carrier OFDM signal includes a first converted analog single-carrier OFDM signal and a second converted analog single-carrier OFDM signal, the carrier center frequency of the first converted analog single-carrier OFDM signal is RF1, the carrier center frequency of the second converted analog single-carrier OFDM signal is RF2, and the difference between RF2 and RF1 is an integral multiple of F0.

Step D4: Perform separate filtering on the analog multi-carrier OFDM signal after frequency conversion, and output at least two channels of separated single-carrier OFDM signals.

In the embodiment of the present invention, because the spectrum shaping filtering is already performed on the multi-carrier OFDM signal before the separate filtering, an analog filter used in the separate filtering may have a wider transition band, which decreases implementation complexity of the analog filter.

Step D5: Perform power amplification on the at least two channels of separated single-carrier OFDM signals, and output at least two single-carrier OFDM signals.

In the embodiment of the present invention, every channel of a separated single-carrier OFDM signal can satisfy a bandwidth requirement of power amplification. Therefore, according to the embodiment of the present invention, a digital pre-distortion technology may be used to perform power amplification to improve amplification efficiency of power amplification, output at least two single-carrier OFDM signals. It should be noted that the at least two single-carrier OFDM signals output in the embodiment of the present invention may be a single channel of a multi-carrier OFDM signal that includes at least two single-carrier OFDM signals, and in this case, the multiple single-carrier OFDM signals form a channel of a multi-carrier OFDM signal. The at least two single-carrier OFDM signals may also be at least two channels of single-carrier OFDM signals, and in this case, each single-carrier OFDM signal is output in the form of a single channel of a signal.

In addition, in the embodiment of the present invention, the analog multi-carrier OFDM signal after frequency conversion includes a first analog single-carrier OFDM signal after frequency conversion, a second analog single-carrier OFDM signal after frequency conversion, and a third analog single-carrier OFDM signal after frequency conversion, where the carrier center frequencies of the first, second, and third analog single-carrier OFDM signals after frequency conversion are the RF1, the RF2, and an RF3 respectively, the RF2 is greater than the RF1 but less than the RF3, the difference between the RF1 and the RF2 is an integral multiple of the F0, the difference between the RF2 and the RF3 is an integral multiple of the F0, the F0 is a subcarrier bandwidth, and the RF1 is less than the carrier center frequency of any other analog single-carrier OFDM signal after frequency conversion in the analog multi-carrier OFDM signal after frequency conversion. A transition band during performing analog spectrum shaping filtering on the first analog single-carrier OFDM signal after frequency conversion is a W3, and a transition band during performing analog spectrum shaping filtering on the second analog single-carrier OFDM signal after frequency conversion is a W4, where the W4 is greater than the W3. In the embodiment of the present invention, an orthogonal relationship among the first analog single-carrier OFDM signal after frequency conversion, the second analog single-carrier OFDM signal after frequency conversion, and the third analog single-carrier OFDM signal after frequency conversion may be used so that the transition band W4 during performing analog spectrum shaping filtering on the second analog single-carrier OFDM signal after frequency conversion is greater than the W3. From the perspective of the frequency domain, the spectrum of the first analog single-carrier OFDM signal after frequency conversion is located at the left edge of the spectrum of the multi-carrier OFDM signal after frequency conversion, and the spectrum of the second analog single-carrier OFDM signal after frequency conversion is located at the center part of the spectrum of the analog multi-carrier OFDM signal after frequency conversion. Therefore, during the design of a carrier selection filter, a filter corresponding to the second analog single-carrier OFDM signal after frequency conversion may have a wider transition band relatively, and especially in the case that the analog multi-carrier OFDM signal after frequency conversion includes multiple analog single-carrier OFDM signals after frequency conversion in a system, multiple analog single-carrier OFDM signals after frequency conversion located at the signal spectrum center may have a wider transition band during the separate filtering relative to the two analog single-carrier OFDM signals after frequency conversion at the signal spectrum edge, which may decrease implementation complexity of the filter.

Figure 5:
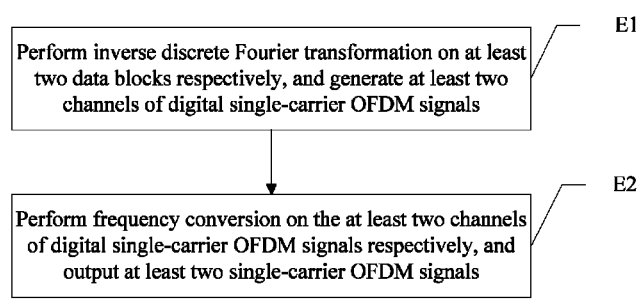
FIG. 5 is a flowchart of a second embodiment of a method for processing at least two data blocks according to an embodiment of the present invention.

Referring to FIG. 5, FIG. 5 is a flowchart of a second embodiment of a method for processing at least two data blocks according to an embodiment of the present invention. In the embodiment of the present invention, the foregoing step of processing at least two data blocks and outputting at least two single-carrier OFDM signals may include:

Step E1: Perform an inverse discrete Fourier transformation on at least two data blocks respectively, and generate at least two channels of digital single-carrier OFDM signals.

In the embodiment of the present invention, the inverse discrete Fourier transformation may be performed on at least two data blocks respectively, and at least two channels of digital single-carrier OFDM signals are generated. The at least two data blocks include a first data block and second data block, and the carrier center frequencies LFs of the generated at least two channels of digital single-carrier OFDM signals are both 0.

Step E2: Perform frequency conversion processing on the at least two channels of digital single-carrier OFDM signals respectively, and output at least two single-carrier OFDM signals.

In the embodiment of the present invention, the frequency conversion processing is respectively performed on every channel of a digital single-carrier OFDM signal generated after the inverse discrete Fourier transformation, and at least two single-carrier OFDM signals are output. It should be noted that the at least two single-carrier OFDM signals output in the embodiment of the present invention may be a single channel of a multi-carrier OFDM signal that includes at least two single-carrier OFDM signals, and in this case, the multiple single-carrier OFDM signals form a channel of a multi-carrier OFDM signal. The at least two single-carrier OFDM signals may also be at least two channels of single-carrier OFDM signals, and in this case, each single-carrier OFDM signal is output in the form of a single channel of a signal.

The at least two single-carrier OFDM signals output after frequency conversion include a first single-carrier OFDM signal corresponding to the first data block and a second single-carrier OFDM signal corresponding to the second data block, the difference between a carrier center frequency RF1 of the first single-carrier OFDM signal and a carrier center frequency RF2 of the second single-carrier OFDM signal is an integral multiple of an F0, and the first single-carrier OFDM signal and the second single-carrier OFDM signal have an orthogonal relationship without setting a corresponding guard bandwidth, which may increase spectrum utilization.

Figure 6:
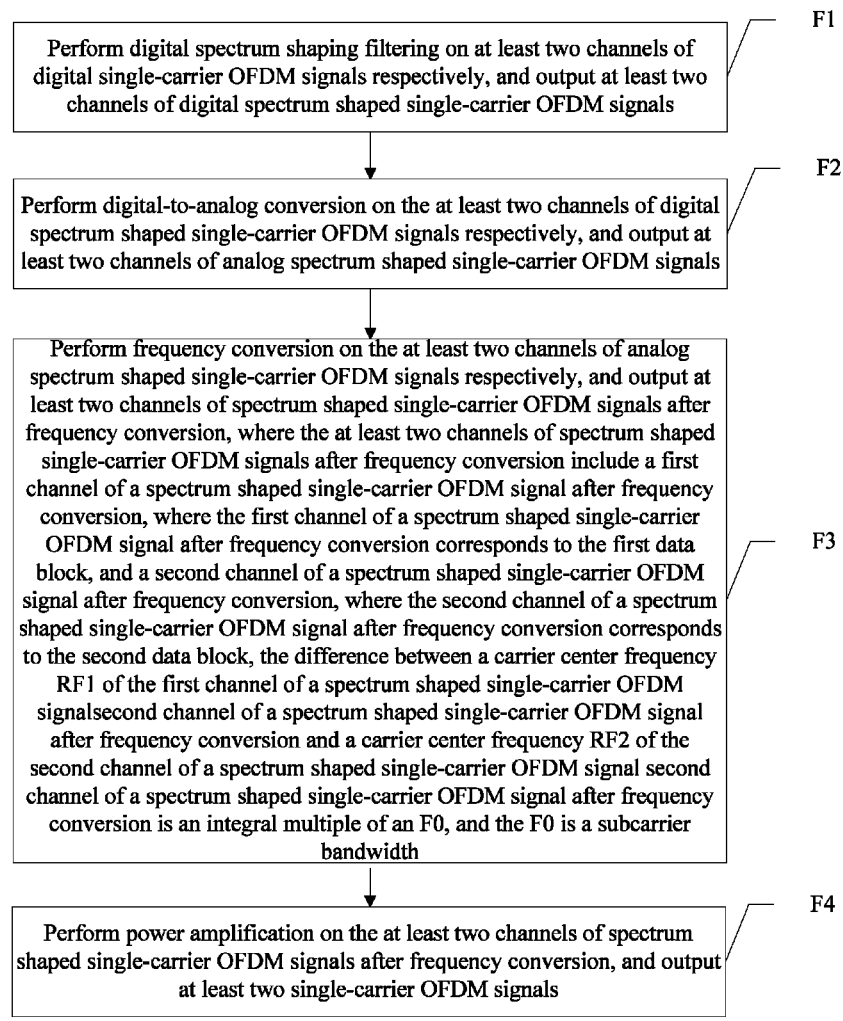
FIG. 6 is a flowchart of a first embodiment of a method for performing frequency conversion processing on at least two channels of digital single-carrier OFDM signals respectively according to an embodiment of the present invention.

FIG. 6 is a flowchart of a first embodiment of a method for performing frequency conversion processing on at least two channels of digital single-carrier OFDM signals respectively according to an embodiment of the present invention. In the embodiment of the present invention, the at least two data blocks include a first data block and a second data block, and the performing frequency conversion processing on at least two channels of digital single-carrier OFDM signals respectively and outputting at least two single-carrier OFDM signals may include the following steps:

Step F1: Perform digital spectrum shaping filtering on at least two channels of digital single-carrier OFDM signals respectively, and output at least two channels of digital spectrum shaped single-carrier OFDM signals.

In the embodiment of the present invention, digital spectrum shaping filtering is performed on every channel of an output digital single-carrier OFDM signal separately, out-of-band radiation of every channel of a digital single-carrier OFDM signal is filtered out, and at least two channels of digital spectrum shaped single-carrier OFDM signals are output.

Step F2: Perform digital-to-analog conversion on the at least two channels of digital spectrum shaped single-carrier OFDM signals respectively, and output at least two channels of analog spectrum shaped single-carrier OFDM signals.

In the embodiment of the present invention, digital-to-analog conversion is performed on every channel of digital spectrum shaped single-carrier OFDM signal respectively, and at least two channels of analog spectrum shaped single-carrier OFDM signals are output.

Step F3: Perform frequency conversion on the at least two channels of analog spectrum shaped single-carrier OFDM signals respectively, and output at least two channels of spectrum shaped single-carrier OFDM signals after frequency conversion, where the at least two channels of spectrum shaped single-carrier OFDM signals after frequency conversion include a first channel of a spectrum shaped single-carrier OFDM signal after frequency conversion, where the first channel of a spectrum shaped single-carrier OFDM signal after frequency conversion corresponds to the first data block, and a second channel of a spectrum shaped single-carrier OFDM signal after frequency conversion, where the second channel of a spectrum shaped single-carrier OFDM signal after frequency conversion corresponds to the second data block, the difference between a carrier center frequency RF1 of the first channel of a spectrum shaped single-carrier OFDM signal after frequency conversion and a carrier center frequency RF2 of the second channel of a spectrum shaped single-carrier OFDM signal after frequency conversion is an integral multiple of an F0, and the F0 is a subcarrier bandwidth.

In the embodiment of the present invention, the difference between the RF1 and the RF2 is an integral multiple of the F0, so that the first channel of a spectrum shaped single-carrier OFDM signal after frequency conversion and the second channel of a spectrum shaped single-carrier OFDM signal after frequency conversion have an orthogonal relationship and spectrum utilization is improved during transmission. In addition, both the RF1 and the RF2 are generated from a common frequency reference through a phase locking and frequency dividing circuit to implement synchronization of center carriers.

Step F4: Perform power amplification on the at least two channels of spectrum shaped single-carrier OFDM signals after frequency conversion, and output at least two single-carrier OFDM signals.

In the embodiment of the present invention, bandwidths of the spectrum shaped single-carrier OFDM signals after frequency conversion both can satisfy a bandwidth requirement of power amplification. Therefore, according to the embodiment of the present invention, a digital pre-distortion technology may be used to perform power amplification to improve amplification efficiency of power amplification, and output at least two single-carrier OFDM signals. It should be noted that the at least two single-carrier OFDM signals output in the embodiment of the present invention may be a single channel of a multi-carrier OFDM signal that includes at least two single-carrier OFDM signals. The at least two single-carrier OFDM signals may also be at least two channels of single-carrier OFDM signals, and in this case, each single-carrier OFDM signal is output in the form of a single channel of a signal.

In the embodiment of the present invention, the difference between the carrier center frequency RF1 of the first channel of a spectrum shaped single-carrier OFDM signal after frequency conversion and the carrier center frequency RF2 of the second channel of a spectrum shaped single-carrier OFDM signal after frequency conversion is an integral multiple of an MF, where the MF is a lowest common multiple of the F0 and an F1, the F0 is a subcarrier bandwidth, and the F1 is a lowest resolution of the carrier center frequency, for example, the F0 may be 15 KHz, the F1 may be 100 KHz or 1 Hz, and the MF may be 300 KHz or 15 KHz. According to the embodiment of the present invention, the RF1 and RF2 may be placed on frequency grids of a system.

In the embodiment of the present invention, the at least two channels of digital single-carrier OFDM signals include a first channel of a digital single-carrier OFDM signal, a second channel of a digital single-carrier OFDM signal, and a third channel of a digital single-carrier OFDM signal. A transition band during performing digital spectrum shaping filtering on the first channel of a digital single-carrier OFDM signal is a W5, and a transition band during performing digital spectrum shaping filtering on the second channel of a digital single-carrier OFDM signal is a W6, where the W6 is greater than the W5. The at least two channels of spectrum shaped single-carrier OFDM signals generated after frequency conversion include a third spectrum shaped single-carrier OFDM signal after frequency conversion, and the carrier center frequency of the third spectrum shaped single-carrier OFDM signal after frequency conversion is an RF3, where the RF2 is greater than the RF1 but less than the RF3, and the RF1 is less than the carrier center frequency of any other channel of a spectrum shaped single-carrier OFDM signal after frequency conversion in the at least two channels of spectrum shaped single-carrier OFDM signals after frequency conversion. From the perspective of the frequency domain, the spectrum of the first spectrum shaped single-carrier OFDM signal after frequency conversion is located at left edges of spectrums of all spectrum shaped single-carrier OFDM signals after frequency conversion, and the spectrum of the second spectrum shaped single-carrier OFDM signal after frequency conversion is located at center parts of spectrums of all spectrum shaped single-carrier OFDM signals after frequency conversion. Therefore, when the digital shaping filtering is performed to filter out out-of-band radiation of the first channel of a digital single-carrier OFDM signal, strict spectrum shaping filtering is required. However, because the second channel of a spectrum shaped single-carrier OFDM signal after frequency conversion that is generated after frequency conversion is performed on the second channel of a digital single-carrier OFDM signal and an adjacent spectrum shaped single-carrier OFDM signal after frequency conversion have an orthogonal relationship, out-of-band radiation of the second channel of a spectrum shaped single-carrier OFDM signal after frequency conversion does not have a great impact on the adjacent spectrum shaped single-carrier OFDM signal after frequency conversion, that is, in the embodiment of the present invention, a filter with a wider transition band may be used when the spectrum shaping filtering is performed on the second channel of a digital single-carrier OFDM signal, and especially in the case that multiple channels of digital single-carrier OFDM signals are included in the system, the digital single-carrier OFDM signal corresponding to the spectrum shaped single-carrier OFDM signal after frequency conversion located at the signal spectrum center may have a wider transition band during the digital spectrum shaping filtering relative to the digital single-carrier OFDM signals corresponding to the first spectrum shaped single-carrier OFDM signal after frequency conversion and a last channel of a spectrum shaped single-carrier OFDM signal after frequency conversion that are at the signal spectrum edge, which may decrease implementation complexity of the filter.

Figure 7:
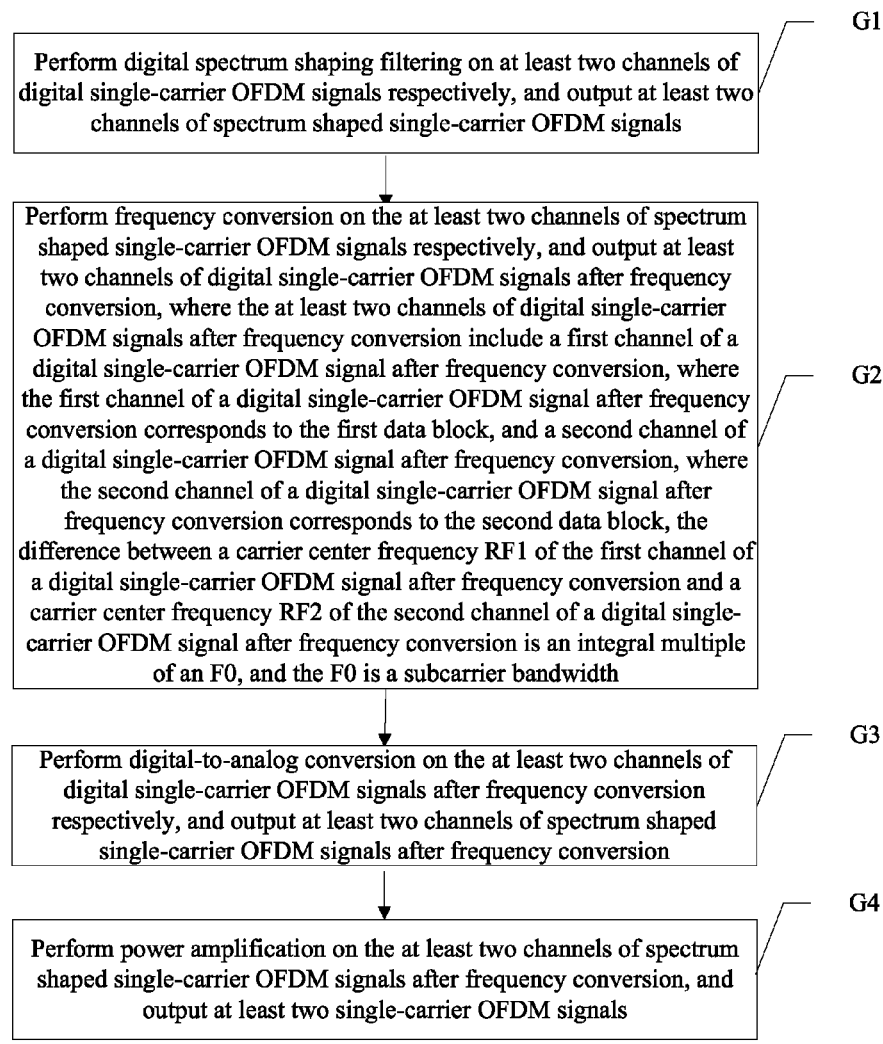
FIG. 7 is a flowchart of a second embodiment of a method for performing frequency conversion processing on at least two channels of digital single-carrier OFDM signals respectively according to an embodiment of the present invention.

Referring to FIG. 7, FIG. 7 is a flowchart of a second embodiment of a method for performing frequency conversion processing on at least two channels of digital single-carrier OFDM signals respectively according to an embodiment of the present invention. In the embodiment of the present invention, the at least two data blocks include a first data block and a second data block, and the performing frequency conversion processing on at least two channels of digital single-carrier OFDM signals respectively and outputting at least two single-carrier OFDM signals may include the following steps:

Step G1: Perform digital spectrum shaping filtering on at least two channels of digital single-carrier OFDM signals respectively, and output at least two channels of digital spectrum shaped single-carrier OFDM signals.

In the embodiment of the present invention, the digital spectrum shaping filtering is performed on every channel of an output digital single-carrier OFDM signal separately, outof-band radiation of every channel of a digital single-carrier OFDM signal is filtered out, and at least two channels of digital spectrum shaped single-carrier OFDM signals are output.

Step G2: Perform frequency conversion on the at least two channels of digital spectrum shaped single-carrier OFDM signals respectively, and output at least two channels of digital single-carrier OFDM signals after frequency conversion, where the at least two channels of digital single-carrier OFDM signals after frequency conversion include a first channel of a digital single-carrier OFDM signal after frequency conversion, where the first channel of a digital single-carrier OFDM signal after frequency conversion corresponds to the first data block, and a second channel of a digital single-carrier OFDM signal after frequency conversion, where the second channel of a digital single-carrier OFDM signal after frequency conversion corresponds to the second data block, the difference between a carrier center frequency RF1 of the first channel of a digital single-carrier OFDM signal after frequency conversion and a carrier center frequency RF2 of the second channel of a digital single-carrier OFDM signal after frequency conversion is an integral multiple of an F0, and the F0 is a subcarrier bandwidth.

In the embodiment of the present invention, the difference between the RF1 and the RF2 is an integral multiple of the F0, so that the first channel of a digital single-carrier OFDM signal after frequency conversion and the second channel of a digital single-carrier OFDM signal after frequency conversion have an orthogonal relationship, and spectrum utilization is improved during transmission. In addition, both the RF1 and the RF2 are generated from a common frequency reference through a phase locking and frequency dividing circuit to implement synchronization of center carriers.

Step G3: Perform digital-to-analog conversion on the at least two channels of digital single-carrier OFDM signals after frequency conversion respectively, and output at least two channels of spectrum shaped single-carrier OFDM signals after frequency conversion.

In the embodiment of the present invention, digital-to-analog conversion is performed on every channel of a digital single-carrier OFDM signal after frequency conversion respectively, and at least two channels of spectrum shaped single-carrier OFDM signals after frequency conversion are output.

Step G4: Perform power amplification on the at least two channels of spectrum shaped single-carrier OFDM signals after frequency conversion, and output at least two single-carrier OFDM signals.

In the embodiment of the present invention, bandwidths of the spectrum shaped single-carrier OFDM signals after frequency conversion can satisfy a bandwidth requirement of power amplification. Therefore, according to the embodiment of the present invention, a digital pre-distortion technology may be used to perform power amplification to improve amplification efficiency of power amplification, and output at least two single-carrier OFDM signals. It should be noted that the at least two single-carrier OFDM signals output in the embodiment of the present invention may be a single channel of a multi-carrier OFDM signal that includes at least two single-carrier OFDM signals. The at least two single-carrier OFDM signals may also be at least two channels of single-carrier OFDM signals, and in this case, each single-carrier OFDM signal is output in the form of a single channel of a signal.

In the embodiment of the present invention, the difference between the carrier center frequency RF1 of the first channel of a digital single-carrier OFDM signal after frequency conversion and the carrier center frequency RF2 of the second channel of a digital single-carrier OFDM signal after frequency conversion is an integral multiple of an MF, where the MF is a lowest common multiple of the F0 and an F1, the F0 is a subcarrier bandwidth, and the F1 is a lowest resolution of the carrier center frequency, for example, the F0 may be 15 KHz, the F1 may be 100 KHz or 1 Hz, and the MF may be 300 KHz or 15 KHz. According to the embodiment of the present invention, the RF1 and RF2 may be placed on frequency grids of a system.

In the embodiment of the present invention, the at least two channels of digital single-carrier OFDM signals include a first digital single-carrier OFDM signal, a second digital single-carrier OFDM signal, and a third digital single-carrier OFDM signal. A transition band during performing digital spectrum shaping filtering on the first channel of a digital single-carrier OFDM signal is a W7, and a transition band during performing digital spectrum shaping filtering on the second channel of a digital single-carrier OFDM signal is a W8, where the W8 is greater than the W7. The at least two channels of digital single-carrier OFDM signals generated after frequency conversion include a third channel of a digital single-carrier OFDM signal after frequency conversion, and the carrier center frequency of the third channel of a digital single-carrier OFDM signal after frequency conversion is an RF3, where the RF2 is greater than the RF1 but less than the RF3, and the RF1 is less than the carrier center frequency of any other channel of a digital single-carrier OFDM signal after frequency conversion in the at least two channels of digital single-carrier OFDM signals after frequency conversion. From the perspective of the frequency domain, the spectrum of the first channel of a digital single-carrier OFDM signal after frequency conversion is located at left edges of spectrums of all digital single-carrier OFDM signals after frequency conversion, and the spectrum of the second channel of a digital single-carrier OFDM signal after frequency conversion is located at center parts of spectrums of all digital single-carrier OFDM signals after frequency conversion. Therefore, when the digital spectrum shaping filtering is performed to filter out out-of-band radiation of the first channel of a digital single-carrier OFDM signal, strict spectrum shaping filtering is required. However, because the second channel of a digital single-carrier OFDM signal after frequency conversion that is generated after frequency conversion is performed on the second channel of a digital single-carrier OFDM signal and an adjacent digital single-carrier OFDM signal after frequency conversion have an orthogonal relationship, out-of-band radiation of the second channel of a digital single-carrier OFDM signal after frequency conversion does not have a great impact on the adjacent digital single-carrier OFDM signal after frequency conversion, that is, in the embodiment of the present invention, a filter with a wider transition band may be used when the digital spectrum shaping filtering is performed on the second channel of a digital single-carrier OFDM signal, and especially in the case that multiple channels of digital single-carrier OFDM signals are included in the system, the digital single-carrier OFDM signal corresponding to the digital single-carrier OFDM signal after frequency conversion located at the signal spectrum center may have a wider transition band during the digital spectrum shaping filtering relative to the digital single-carrier OFDM signals corresponding to the first channel of a digital single-carrier OFDM signal after frequency conversion and a last channel of a digital single-carrier OFDM signal after frequency conversion that are at the signal spectrum edge, which may decrease implementation complexity of the filter.

Figure 8:
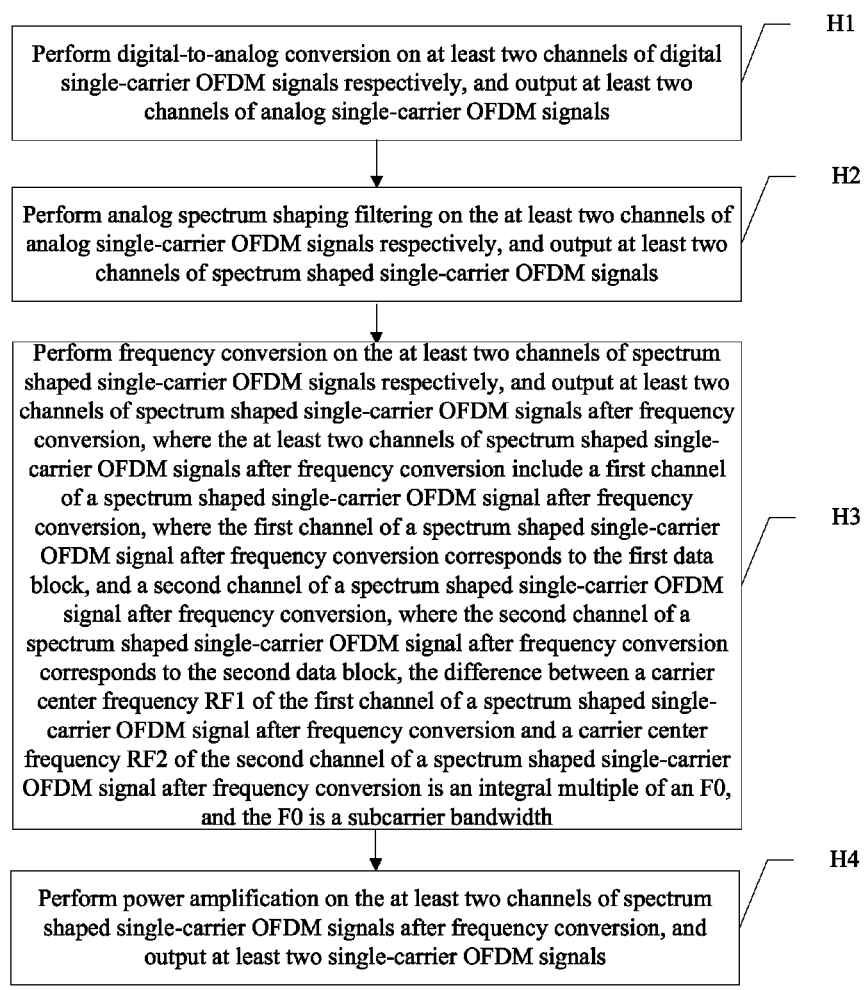
FIG. 8 is a flowchart of a third embodiment of a method for performing frequency conversion processing on at least two channels of digital single-carrier OFDM signals respectively according to an embodiment of the present invention.

Referring to FIG. 8, FIG. 8 is a flowchart of a third embodiment of a method for performing frequency conversion processing on at least two channels of digital single-carrier OFDM signals respectively according to an embodiment of the present invention. In the embodiment of the present invention, the at least two data blocks include a first data block and a second data block, and the performing frequency conversion processing on at least two channels of digital single-carrier OFDM signals respectively and outputting at least two single-carrier OFDM signals may include the following steps:

Step H1: Perform digital-to-analog conversion on at least two channels of digital single-carrier OFDM signals respectively, and output at least two channels of analog single-carrier OFDM signals.

In the embodiment of the present invention, the digital-to-analog conversion may be performed on every channel of a digital single-carrier OFDM signal respectively, and at least two channels of analog single-carrier OFDM signals are output.

Step H2: Perform analog spectrum shaping filtering on the at least two channels of analog single-carrier OFDM signals respectively, and output at least two channels of spectrum shaped single-carrier OFDM signals.

In the embodiment of the present invention, the analog spectrum shaping filtering may be performed on every channel of an analog single-carrier OFDM signal respectively, and at least two channels of analog spectrum shaped single-carrier OFDM signals are output. In the embodiment of the present invention, the frequency conversion may be performed to convert the carrier center frequency LF of every channel of an analog single-carrier OFDM signal into the carrier center frequency of a corresponding analog shaping filter, and then the corresponding analog shaping filter is used to perform spectrum shaping filtering on every channel of an analog single-carrier OFDM signal respectively.

Step H3: Perform frequency conversion on the at least two channels of spectrum shaped single-carrier OFDM signals respectively, and output at least two channels of spectrum shaped single-carrier OFDM signals after frequency conversion, where the at least two channels of spectrum shaped single-carrier OFDM signals after frequency conversion include a first channel of a spectrum shaped single-carrier OFDM signal after frequency conversion, where the first channel of a spectrum shaped single-carrier OFDM signal after frequency conversion corresponds to the first data block, and a second channel of a spectrum shaped single-carrier OFDM signal after frequency conversion, where the second channel of a spectrum shaped single-carrier OFDM signal after frequency conversion corresponds to the second data block, the difference between a carrier center frequency RF1 of the first channel of a spectrum shaped single-carrier OFDM signal after frequency conversion and a carrier center frequency RF2 of the second channel of a spectrum shaped single-carrier OFDM signal after frequency conversion is an integral multiple of an F0, and the F0 is a subcarrier bandwidth.

In the embodiment of the present invention, the frequency conversion may be performed on every channel of a spectrum shaped single-carrier OFDM signal respectively, where the difference between the carrier center frequency RF1 of the first channel of a spectrum shaped single-carrier OFDM signal after frequency conversion and the carrier center frequency RF2 of the second channel of a spectrum shaped single-carrier OFDM signal after frequency conversion is an integral multiple of the F0, so that a first channel of an OFDM signal and a second channel of an OFDM signal have an orthogonal relationship and spectrum utilization is improved during transmission. Both the carrier center frequencies RF1 and RF2 are generated from a common frequency reference through a phase locking and frequency dividing circuit to implement synchronization of center carriers.

Step H4: Perform power amplification on the at least two spectrum shaped single-carrier OFDM signals after frequency conversion and output at least two single-carrier OFDM signals.

In the embodiment of the present invention, bandwidths of the spectrum shaped single-carrier OFDM signals after frequency conversion can satisfy a bandwidth requirement of power amplification. Therefore, according to the embodiment of the present invention, a digital pre-distortion technology may be used to perform power amplification to improve amplification efficiency of power amplification, and output at least two single-carrier OFDM signals. It should be noted that the at least two single-carrier OFDM signals output in the embodiment of the present invention may be a single channel of a multi-carrier OFDM signal that includes at least two single-carrier OFDM signals. The at least two single-carrier OFDM signals may also be at least two channels of single-carrier OFDM signals, and in this case, each single-carrier OFDM signal is output in the form of a single channel of a signal.

In the embodiment of the present invention, the difference between the carrier center frequency RF1 of the first channel of a spectrum shaped single-carrier OFDM signal after frequency conversion and the carrier center frequency RF2 of the second channel of a spectrum shaped single-carrier OFDM signal after frequency conversion is an integral multiple of an MF, where the MF is a lowest common multiple of the F0 and an F1, the F0 is a subcarrier bandwidth, and the F1 is a lowest resolution of the carrier center frequency, for example, the F0 may be 15 KHz, the F1 may be 100 KHz or 1 Hz, and the MF may be 300 KHz or 15 KHz. According to the embodiment of the present invention, the RF1 and RF2 may be placed on frequency grids of a system.

In the embodiment of the present invention, the at least two channels of analog single-carrier OFDM signals include a first analog single-carrier OFDM signal, a second analog single-carrier OFDM signal, and a third analog single-carrier OFDM signal. A transition band during performing analog spectrum shaping filtering on the first analog single-carrier OFDM signal is a W9, and a transition band during performing analog spectrum shaping filtering on the second analog single-carrier OFDM signal is a W10, where the W10 is greater than the W9. The at least two channels of spectrum shaped single-carrier OFDM signals generated after frequency conversion include a third channel of a spectrum shaped single-carrier OFDM signal after frequency conversion, and the carrier center frequency of the third channel of a spectrum shaped single-carrier OFDM signal after frequency conversion is an RF3, where the RF2 is greater than the RF1 but less than the RF3, and the RF1 is less than the carrier center frequency of any other channel of a spectrum shaped single-carrier OFDM signal after frequency conversion in the at least two channels of spectrum shaped single-carrier OFDM signals after frequency conversion. From the perspective of the frequency domain, the spectrum of the first channel of a spectrum shaped single-carrier OFDM signal after frequency conversion is located at left edges of spectrums of all spectrum shaped single-carrier OFDM signals after frequency conversion, and the spectrum of the second channel of a spectrum shaped single-carrier OFDM signal after frequency conversion is located at center parts of spectrums of all spectrum shaped single-carrier OFDM signals after frequency conversion. Therefore, when the spectrum shaping filtering is performed to filter out out-of-band radiation of the first channel of an analog single-carrier OFDM signal, strict spectrum shaping filtering is required. However, because the second channel of a spectrum shaped single-carrier OFDM signal after frequency conversion that is generated after frequency conversion is performed on the second channel of an analog single-carrier OFDM signal and an adjacent spectrum shaped single-carrier OFDM signal after frequency conversion have an orthogonal relationship, out-of-band radiation of the second channel of a spectrum shaped single-carrier OFDM signal after frequency conversion does not have a great impact on the adjacent spectrum shaped single-carrier OFDM signal after frequency conversion, that is, a filter with a wider transition band may be used when the analog spectrum shaping filtering is performed on the second channel of an analog single-carrier OFDM signal, and especially in the case that multiple channels of analog single-carrier OFDM signals are included in the system, the analog single-carrier OFDM signal corresponding to the spectrum shaped single-carrier OFDM signal after frequency conversion located at the signal spectrum center may have a wider transition band during the analog spectrum shaping filtering relative to the first channel of an analog single-carrier OFDM signal and a last channel of an analog single-carrier OFDM signal that correspond to the two channels of spectrum shaped single-carrier OFDM signals after frequency conversion at the signal spectrum edge, which may decrease implementation complexity of the filter.

Figure 9:
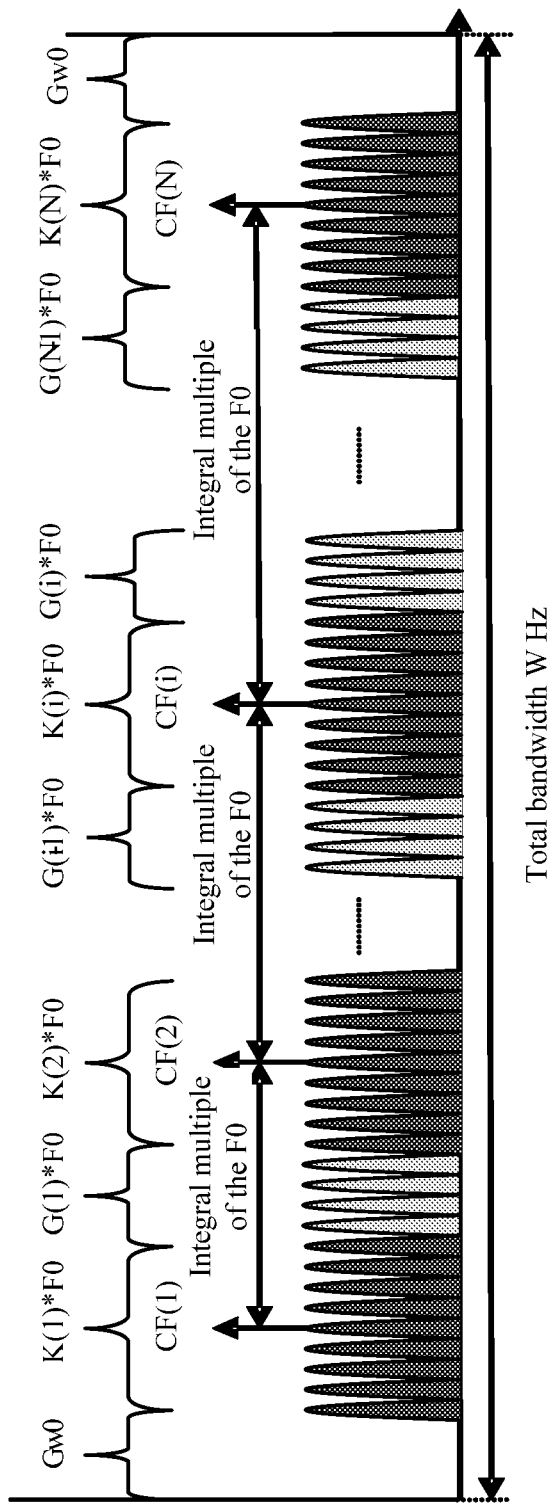
FIG. 9 is a schematic diagram of a spectrum of a generated multi-carrier OFDM signal according to an embodiment of the present invention.

To help understand the present invention in more detail, a specific application scenario of the present invention is provided in the following. Referring to FIG. 9, FIG. 9 is a schematic diagram of a spectrum of a generated multi-carrier OFDM signal according to an embodiment of the present invention.

First, the data that needs to be modulated is arranged according to a rule, and then an inverse discrete Fourier transformation is performed on the arranged data. In the embodiment of the present invention, a long IFFT is used to generate a channel of a multi-carrier OFDM signal, and certainly, a separate IFFT may also be used to generate multiple channels of single-carrier OFDM signals, where both the multi-carrier OFDM signal and the single-carrier OFDM signal include multiple subcarriers, and adjacent subcarriers have an orthogonal relationship. It should be noted that the IFFT is only an implementation mode of the inverse discrete Fourier transformation, and other transformation modes may also be used. Data arrangement has the following characteristics: first $G(0)$ zeros, then $K(1)$ pieces of data, then $G(1)$ zeros, then $K(2)$ pieces of data, then zeros and data arranged according to similar rules, $G(i-1)$ zeros, $K(i)$ pieces of data, ..., $G(N-1)$ zeros, $K(N)$ data, and finally $G(0)$ pieces of data. In the embodiment of the present invention, $K(1)$ pieces of data are a data block, and accordingly, $K(i)$ pieces of data are also a data block. The data input into an IFFT transformer may be any cyclic shift of the foregoing data, and the spectrum of the generated multi-carrier OFDM signal is as shown in FIG. 9.

The multi-carrier OFDM signal generated after the inverse fast Fourier transformation includes N single-carrier OFDM signals, and a total bandwidth allocated by the system for the multi-carrier OFDM signal is W Hz, where the $i^{th}$ single-carrier OFDM signal includes $K(i)$ subcarriers, and the bandwidth of each subcarrier is an F0. Therefore, the total bandwidth of the $i^{th}$ single-carrier OFDM signal is $K(i)*F0$ Hz, where the F0, for example, may be 15 KHz. The carrier center frequency of the first single-carrier OFDM signal in the multi-carrier OFDM signal is CF(1) Hz, the second single-carrier OFDM signal in the multi-carrier OFDM signal is CF(2) Hz, and the $i^{th}$ single-carrier OFDM signal in the multi-carrier OFDM signal is CF(i) Hz, that is, both ends of CF(i) have $K(i)/2$ subcarriers respectively, where $K(i)$ may be an odd number. In the embodiment of the present invention, the minimum $G(0), G(1), G(2), \ldots, G(N-1)$ are selected, and thus the difference between carrier center frequencies of adjacent single-carrier OFDM signals is an integral multiple of an MF, where the MF is a lowest common multiple of the F1 and an F0, and the F1 is a lowest resolution of the carrier center frequency, for example, the F1 may be 100 KHz. It should be noted that if the system does not require the carrier center frequency CF(i) of one single-carrier OFDM signal to be an integral multiple of the F1, $G(i)$ may be zero. For example, if the system does not require the carrier center frequency CF(i) of the $i^{th}$ single-carrier OFDM signal to be an integral multiple of the F1, $G(i)$ may be zero. However, CF(i) is still an integral number of the F0. Therefore, adjacent single-carrier OFDM signals in the multi-carrier OFDM signal still have an orthogonal relationship.

To help better understand the embodiment of the present invention, the following specific instantiated parameters are given: The F0 is 15 KHz, and the F1 is 100 KHz; the number of subcarriers included in each single-carrier OFDM signal is the same, that is, all $K(i)$ values are equal and all $G(i)$ values (i is not zero) are also equal. Then the values of $K(i)$ and $G(i)$ may be set as follows:

$K(i)=1201, G(i)=19;$ $K(i)=1225, G(i)=15;$ $K(i)=1249, G(i)=11;$ $K(i)=1273, G(i)=7;$ $K(i)=1297, G(i)=3;$

The foregoing parameters may ensure that the difference between carrier center frequencies of single-carrier OFDM signals is an integral number of 300 KHz.

Figure 10:
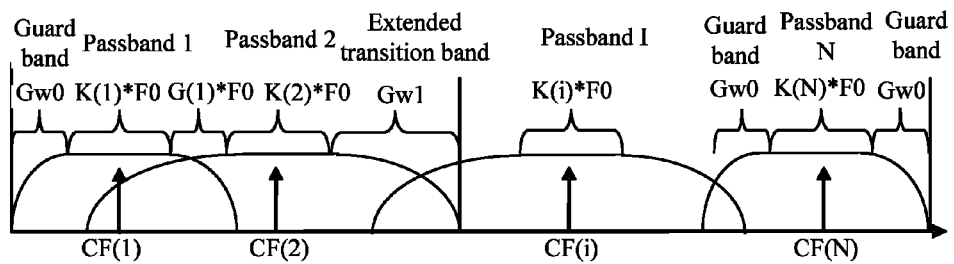
FIG. 10 is a schematic diagram of amplitude-frequency characteristics of a spectrum shaping filter according to an embodiment of the present invention.

Referring to FIG. 10, FIG. 10 is a schematic diagram of amplitude-frequency characteristics of a spectrum shaping filter according to an embodiment of the present invention. After a channel of a multi-carrier OFDM signal is generated by performing an inverse discrete Fourier transformation, a filter may be used to perform spectrum shaping on every single-carrier OFDM signal respectively, and the amplitude-frequency characteristics of the filter are as shown in FIG. 10.

The filter with amplitude-frequency characteristics shown in FIG. 10 may be used to split the wideband multi-carrier OFDM signal into N channels of single-carrier OFDM signals. An edge spectrum shaping filter may be used to perform spectrum shaping filtering on two single-carrier OFDM signals on two ends of the multi-carrier OFDM signal, that is, the first single-carrier OFDM signal and the $N^{th}$ single-carrier OFDM signal, while a center spectrum shaping filter may be used to perform spectrum shaping filtering on other single-carrier OFDM signals. A transition band of the edge spectrum shaping filter from a passband to a stopband is Gw0 Hz, while a transition band Gw1 of the center spectrum shaping filter from a passband to a stopband is far greater than Gw0 Hz. Therefore, no matter whether digital spectrum shaping filtering or analog spectrum shaping filtering is used, the digital spectrum shaping filtering or the analog spectrum shaping filtering is easily implemented by a center spectrum shaping filter. In addition, a wide transition band may bring optimization of a group delay, and decrease interference between adjacent single-carrier OFDM signals effectively.

After the spectrum shaping filtering is performed on the multi-carrier OFDM signal, frequency up-conversion may be performed on every channel of a single-carrier OFDM signal, and the carrier center frequency of the single-carrier OFDM signal after frequency conversion is an RF(i), where i=1, 2, . . . , N. The difference between carrier center frequencies of adjacent single-carrier OFDM signals is still an integral number of an MF. The carrier center frequency of all N OFDM signals is RFc Hz, and is located at the exact center of a channel. After the frequency up-conversion is performed on the spectrum shaped single-carrier OFDM signal, a digital pre-distortion technology may be used to perform power amplification on the single-carrier OFDM signal after the frequency up-conversion to generate N single-carrier OFDM signals, where each single-carrier OFDM signal may be transmitted by using a separate antenna, or the N single-carrier OFDM signals may be combined by using a combiner and then transmitted through an antenna. In the embodiment of the present invention, a digital filter used in the spectrum shaping or the separate filtering may be a finite impulse response filter, and an analog filter may be a surface acoustic wave (SAW, surface acoustic wave) filter, or may be a film bulk acoustic resonator (FBAR, film bulk acoustic resonator), and may also be implemented in a power splitter, or may be a separate filter.

In the embodiment of the present invention, the spectrum shaping filtering may be performed on the multi-carrier OFDM signal according to the filtering method shown in FIG. 10, and finally a power amplifier is used to amplify the spectrum shaped multi-carrier OFDM signal, but an ADC interleaving method is used to sample the output signal of the power amplifier, so that fifth-order intermodulation and sampling can be performed on the spectrum shaped multi-carrier OFDM signal, and the digital pre-distortion technology is used to perform power amplification on the spectrum shaped multi-carrier OFDM signal.

Figure 11:
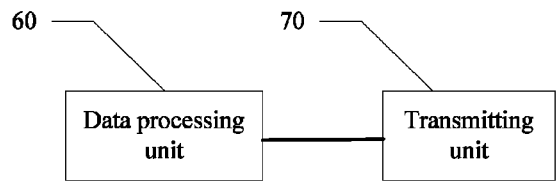
FIG. 11 is a schematic diagram of an embodiment of a modulation apparatus according to the present invention.

Referring to FIG. 11, FIG. 11 is a schematic diagram of an embodiment of a modulation apparatus according to the present invention. The embodiment of the modulation apparatus of the present invention mainly includes a data processing unit 60 and a transmitting unit 70.

The data processing unit 60 is configured to: process at least two data blocks, and output at least two single-carrier OFDM signals, where the at least two data blocks include a first data block and a second data block, the at least two single-carrier OFDM signals include a first single-carrier OFDM signal corresponding to the first data block and a second single-carrier OFDM signal corresponding to the second data block, a difference between a carrier center frequency RF1 of the first single-carrier OFDM signal and a carrier center frequency RF2 of the second single-carrier OFDM signal is an integral multiple of an F0, and the F0 is a subcarrier bandwidth.

The transmitting unit 70 is configured to transmit the at least two single-carrier OFDM signals.

In the embodiment of the present invention, the difference between the carrier center frequency RF1 of the first single-carrier OFDM signal and the carrier center frequency RF2 of the second single-carrier OFDM signal is an integral multiple of an MF, where the first single-carrier OFDM signal and the second single-carrier OFDM signal are output by the data processing unit 60, and the MF is a lowest common multiple of the F0 and an F1, and the F1 is a lowest resolution of the carrier center frequency.

The embodiment of the modulation apparatus of the present invention may be used in the foregoing corresponding modulation method embodiment.

Figure 12:
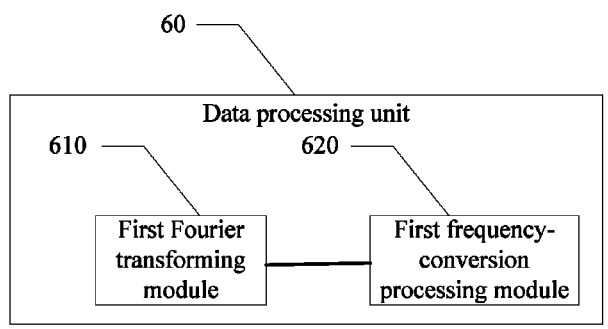
FIG. 12 is a schematic diagram of a first embodiment of a data processing unit in the embodiment of the modulation apparatus according to the present invention.

Referring to FIG. 12, FIG. 12 is a schematic diagram of a first embodiment of a data processing unit in the embodiment of the modulation apparatus according to the present invention. The first embodiment of the data processing unit 60 in the embodiment of the modulation apparatus of the present invention may include:

a first Fourier transforming module 610, configured to perform an inverse discrete Fourier transformation on at least two data blocks, and generate a multi-carrier OFDM signal, where the at least two data blocks include a first data block and a second data block, the multi-carrier OFDM signal includes a first digital single-carrier OFDM signal corresponding to the first data block and a second digital single-carrier OFDM signal corresponding to the second data block, the difference between a carrier center frequency CF1 of the first digital single-carrier OFDM signal and a carrier center frequency CF2 of the second digital single-carrier OFDM signal is an integral multiple of an F0, and the F0 is a subcarrier bandwidth; and a first frequency-conversion processing module 620, configured to perform frequency conversion processing on the multi-carrier OFDM signal output by the first Fourier transforming module 610, and output at least two single-carrier OFDM signals.

In the embodiment of the present invention, the difference between the carrier center frequency CF1 of the first digital single-carrier OFDM signal and the carrier center frequency CF2 of the second digital single-carrier OFDM signal is an integral multiple of an MF, where the first digital single-carrier OFDM signal and the second digital single-carrier OFDM signal are in the multi-carrier OFDM signal output by the first Fourier transforming module 610, and the MF is a lowest common multiple of the F0 and an F1, and the F1 is a lowest resolution of the carrier center frequency.

The first embodiment of the data processing unit 60 in the embodiment of the modulation apparatus according to the present invention may be used in the foregoing first embodiment of the method for processing at least two data blocks.

Figure 13:
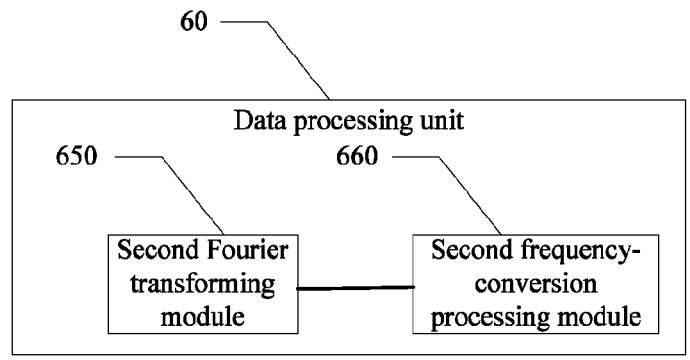
FIG. 13 is a schematic diagram of a second embodiment of a data processing unit in the embodiment of the modulation apparatus according to the present invention.

Referring to FIG. 13, FIG. 13 is a schematic diagram of a second embodiment of a data processing unit in the embodiment of the modulation apparatus according to the present invention. The second embodiment of the data processing unit 60 in the embodiment of the modulation apparatus according to the present invention may include:

a second Fourier transforming module 650, configured to perform an inverse discrete Fourier transformation on at least two data blocks respectively, and generate at least two channels of digital single-carrier OFDM signals; and a second frequency-conversion processing module 660, configured to respectively perform frequency conversion processing on the at least two channels of digital single-carrier OFDM signals output by the second Fourier transforming module 650, and output at least two single-carrier OFDM signals, where the difference between the carrier center frequency RF1 of the first single-carrier OFDM signal and the carrier center frequency RF2 of the second single-carrier OFDM signal is an integral multiple of an MF, where the MF is a lowest common multiple of the subcarrier bandwidth F0 of the OFDM signal and a lowest resolution F1 of the carrier center frequency of the OFDM signal.

The second embodiment of the data processing unit 60 in the embodiment of the modulation apparatus according to the present invention may be used in the corresponding second embodiment of the method for processing at least two data blocks.

Figure 14:
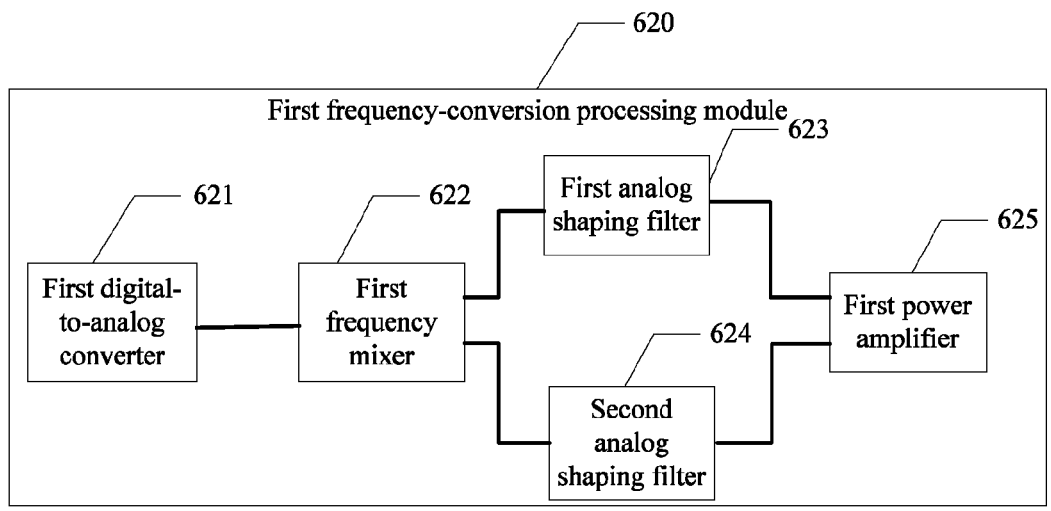
FIG. 14 is a schematic diagram of a first embodiment of a first frequency-conversion processing module in the embodiment of the modulation apparatus according to the present invention.

Referring to FIG. 14, FIG. 14 is a schematic diagram of a first embodiment of a first frequency-conversion processing module in the embodiment of the modulation apparatus of according to present invention. The first frequency-conversion processing module 620 in the embodiment of the modulation apparatus according to the present invention may include:

a first digital-to-analog converter 621, configured to perform digital-to-analog conversion on the multi-carrier OFDM signal output by the first Fourier transforming module 610, and output an analog multi-carrier OFDM signal;

a first frequency mixer 622, configured to perform frequency conversion on the analog multi-carrier OFDM signal output by the first digital-to-analog converter 621, and output a multi-carrier OFDM signal after frequency conversion;

a first analog shaping filter 623, configured to perform analog spectrum shaping filtering on the multi-carrier OFDM signal after frequency conversion, where the multi-carrier OFDM signal after frequency conversion is output by the first frequency mixer 622, and output a first channel of a spectrum shaped single-carrier OFDM signal corresponding to the first data block;

a second analog shaping filter 624, configured to perform analog spectrum shaping filtering on the analog multi-carrier OFDM signal after frequency conversion, where the analog multi-carrier OFDM signal after frequency conversion is output by the first frequency mixer 622, and output a second channel of a spectrum shaped single-carrier OFDM signal corresponding to the second data block; and a first power amplifier 625, configured to perform power amplification on the first channel of a spectrum shaped single-carrier OFDM signal and the second channel of a spectrum shaped single-carrier OFDM signal, and output at least two single-carrier OFDM signals.

The first frequency-conversion processing module 620 in the embodiment of the modulation apparatus according to the present invention may be used in the corresponding first embodiment of a method for performing frequency conversion processing on a multi-carrier OFDM signal. It should be noted that in the embodiment of the present invention, two power amplifiers may be used to perform power amplification on the foregoing first channel of a spectrum shaped single-carrier OFDM signal and second channel of a spectrum shaped single-carrier OFDM signal respectively, or the first channel of a spectrum shaped single-carrier OFDM signal and second channel of a spectrum shaped single-carrier OFDM signal are combined by using a combiner and then a power amplifier is used to perform power amplification.

Figure 15:
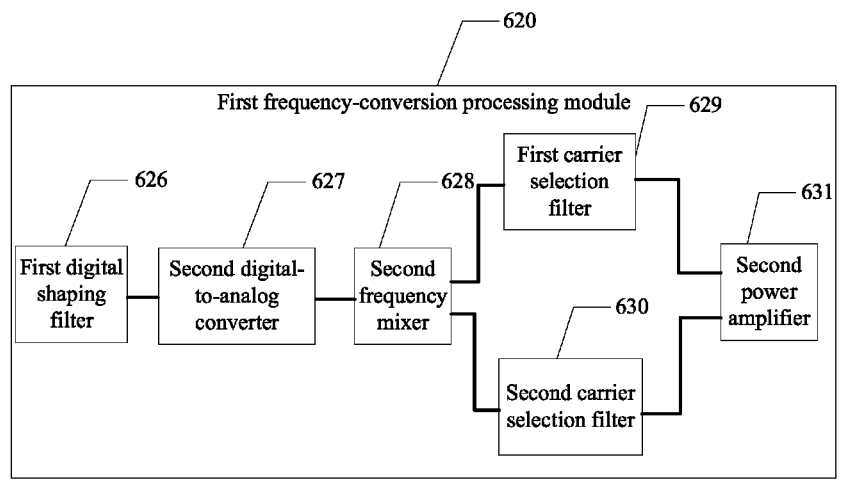
FIG. 15 is a schematic diagram of a second embodiment of a first frequency-conversion processing module in the embodiment of the modulation apparatus according to the present invention.

Referring to FIG. 15, FIG. 15 is a schematic diagram of a second embodiment of a first frequency-conversion processing module in the embodiment of the modulation apparatus according to the present invention. The first frequency-conversion processing module 620 in the embodiment of the modulation apparatus according to the present invention may include:

a first digital shaping filter 626, configured to perform digital spectrum shaping filtering on the multi-carrier OFDM signal output by the first Fourier transforming module 610, and output a spectrum shaped multi-carrier OFDM signal;

a second digital-to-analog converter 627, configured to perform digital-to-analog conversion on the spectrum shaped multi-carrier OFDM signal output by the first digital shaping filter 626, and output an analog spectrum shaped multi-carrier OFDM signal;

a second frequency mixer 628, configured to perform frequency conversion on the analog spectrum shaped multi-carrier OFDM signal output by the second digital-to-analog converter 627, and output an analog multi-carrier OFDM signal after frequency conversion;

a first carrier selection filter 629, configured to perform separate filtering on the analog multi-carrier OFDM signal after frequency conversion, where the analog multi-carrier OFDM signal after frequency conversion is output by the second frequency mixer 628, and output a first channel of a separated single-carrier OFDM signal corresponding to the first data block;

a second carrier selection filter 630, configured to perform separate filtering on the analog multi-carrier OFDM signal after frequency conversion, where the analog multi-carrier OFDM signal after frequency conversion is output by the second frequency mixer 628, and output a second channel of a separated single-carrier OFDM signal corresponding to the second data block; and a second power amplifier 631, configured to perform power amplification on the first channel of a separated single-carrier OFDM signal and the second channel of a separated single-carrier OFDM signal, and output at least two single-carrier OFDM signals.

The first frequency-conversion processing module 620 in the embodiment of the modulation apparatus according to the present invention may be used in the corresponding second embodiment of a method for performing frequency conversion processing on a multi-carrier OFDM signal. It should be noted that in the embodiment of the present invention, two power amplifiers may be used to perform power amplification on the foregoing first channel of a separated single-carrier OFDM signal and second channel of a separated single-carrier OFDM signal respectively, or the first channel of a separated single-carrier OFDM signal and second channel of a separated single-carrier OFDM signal are combined by using a combiner and then a power amplifier is used to perform power amplification.

Figure 16:
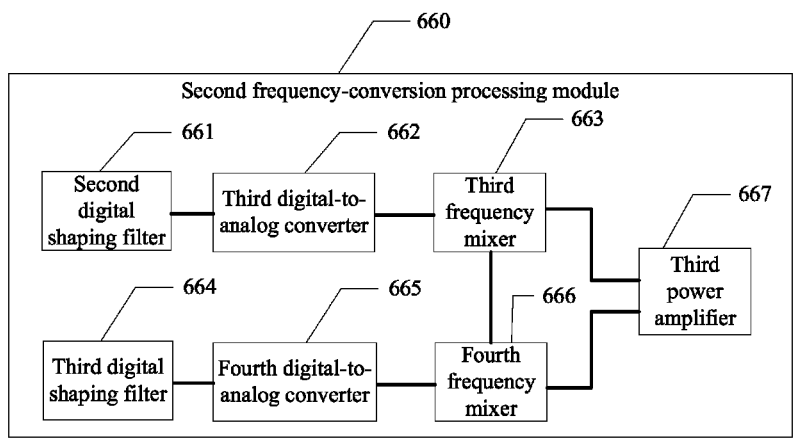
FIG. 16 is a schematic diagram of a first embodiment of a second frequency-conversion processing module in the embodiment of the modulation apparatus according to the present invention.

Referring to FIG. 16, FIG. 16 is a schematic diagram of a first embodiment of a second frequency-conversion processing module in the embodiment of the modulation apparatus according to the present invention. The second frequency-conversion processing module 660 in the embodiment of the modulation apparatus according to the present invention may include:

a second digital shaping filter 661, configured to perform digital spectrum shaping filtering on a first channel of a digital single-carrier OFDM signal output by a second Fourier transforming module 650, and output a first channel of a digital spectrum shaped single-carrier OFDM signal;

a third digital-to-analog converter 662, configured to perform digital-to-analog conversion on the first channel of a digital spectrum shaped single-carrier OFDM signal output by the second digital shaping filter 661, and output a first channel of an analog spectrum shaped single-carrier OFDM signal;

a third frequency mixer 663, configured to perform frequency conversion on the first channel of an analog spectrum shaped single-carrier OFDM signal output by the third digital-to-analog converter 662, and output a first channel of a spectrum shaped single-carrier OFDM signal after frequency conversion, where the carrier center frequency of the first channel of a spectrum shaped single-carrier OFDM signal after frequency conversion is an RF1;

a third digital shaping filter 664, configured to perform digital spectrum shaping filtering on a second channel of a digital single-carrier OFDM signal output by the second Fourier transforming module 650, and output a second channel of a digital spectrum shaped single-carrier OFDM signal;

a fourth digital-to-analog converter 665, configured to perform digital-to-analog conversion on the second channel of a digital spectrum shaped single-carrier OFDM signal output by the third digital shaping filter 664, and output a second channel of an analog spectrum shaped single-carrier OFDM signal;

a fourth frequency mixer 666, configured to perform frequency conversion on the second channel of an analog spectrum shaped single-carrier OFDM signal output by the fourth digital-to-analog converter 665, and output a second channel of a spectrum shaped single-carrier OFDM signal after frequency conversion, where the carrier center frequency of the second channel of a spectrum shaped single-carrier OFDM signal after frequency conversion is an RF2, where the difference between the RF2 and the RF1 is an integral multiple of an F0, and the F0 is a subcarrier bandwidth; and a third power amplifier 667, configured to perform power amplification on the first channel of a spectrum shaped single-carrier OFDM signal after frequency conversion and the second channel of a spectrum shaped single-carrier OFDM signal after frequency conversion, and output at least two single-carrier OFDM signals.

In the embodiment of the present invention, the difference between the carrier center frequency RF2 of the second channel of a spectrum shaped single-carrier OFDM signal after frequency conversion and the RF1 is an integral multiple of an MF, where the second channel of a spectrum shaped single-carrier OFDM signal after frequency conversion is output by the fourth frequency mixer 666, and the MF is a lowest common multiple of the F0 and an F1, and the F1 is a lowest resolution of the carrier center frequency.

The second frequency-conversion processing module 660 in the embodiment of the modulation apparatus according to the present invention may be used in the corresponding first embodiment of a method for performing frequency conversion processing on at least two channels of digital single-carrier OFDM signals respectively. It should be noted that in the embodiment of the present invention, two power amplifiers may be used to perform power amplification on the foregoing first channel of a spectrum shaped single-carrier OFDM signal after frequency conversion and second channel of a spectrum shaped single-carrier OFDM signal after frequency conversion respectively, or the first channel of a spectrum shaped single-carrier OFDM signal after frequency conversion and second channel of a spectrum shaped single-carrier OFDM signal after frequency conversion are combined by using a combiner and then a power amplifier is used to perform power amplification.

Figure 17:
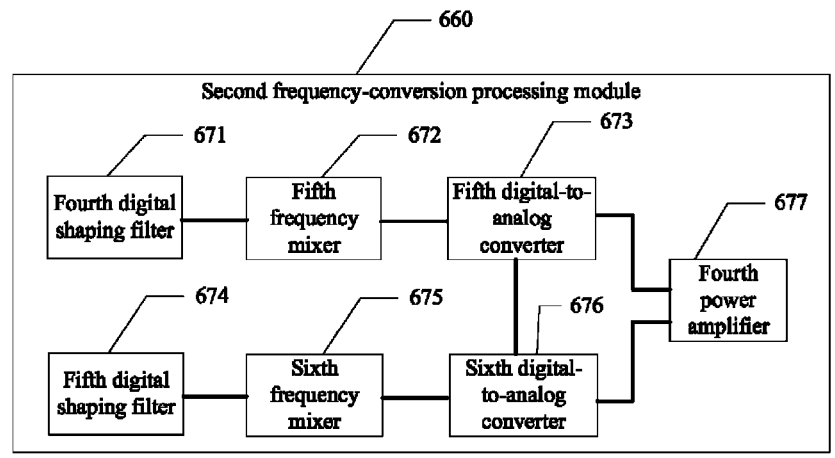
FIG. 17 is a schematic diagram of a second embodiment of a second frequency-conversion processing module in the embodiment of the modulation apparatus according to the present invention.

Referring to FIG. 17, FIG. 17 is a schematic diagram of a second embodiment of a second frequency-conversion processing module in the embodiment of the modulation apparatus according to the present invention. The second frequency-conversion processing module 660 in the embodiment of the modulation apparatus according to the present invention may include:

a fourth digital shaping filter 671, configured to perform digital spectrum shaping filtering on a first channel of a digital single-carrier OFDM signal output by a second Fourier transforming module 650, and output a first channel of a digital spectrum shaped single-carrier OFDM signal;

a fifth frequency mixer 672, configured to perform frequency conversion on the first channel of a digital spectrum shaped single-carrier OFDM signal output by the fourth digital shaping filter 671, and output a first channel of a digital single-carrier OFDM signal after frequency conversion, where the carrier center frequency of the first channel of a digital single-carrier OFDM signal after frequency conversion is an RF1;

a fifth digital-to-analog converter 673, configured to perform digital-to-analog conversion on the first channel of a digital single-carrier OFDM signal after frequency conversion, where the first channel of a digital single-carrier OFDM signal after frequency conversion is output by the fifth frequency mixer 672, and output a first channel of a spectrum shaped single-carrier OFDM signal after frequency conversion;

a fifth digital shaping filter 674, configured to perform digital spectrum shaping filtering on the second channel of a digital single-carrier OFDM signal output by the second Fourier transforming module 650, and output a second channel of a digital spectrum shaped single-carrier OFDM signal;

a sixth frequency mixer 675, configured to perform frequency conversion on the second channel of a digital spectrum shaped single-carrier OFDM signal output by the fifth digital shaping filter 674, and output a second channel of a digital single-carrier OFDM signal after frequency conversion, where the carrier center frequency of the second channel of a digital single-carrier OFDM signal after frequency conversion is an RF2, and the difference between the RF2 and the RF1 is an integral multiple of an F0, and the F0 is a subcarrier bandwidth;

a sixth digital-to-analog converter 676, configured to perform digital-to-analog conversion on the second channel of a digital single-carrier OFDM signal after frequency conversion, where the second channel of a digital single-carrier OFDM signal after frequency conversion is output by the sixth frequency mixer 675, and output a second channel of a spectrum shaped single-carrier OFDM signal after frequency conversion; and a fourth power amplifier 677, configured to perform power amplification on the first channel of a spectrum shaped single-carrier OFDM signal after frequency conversion and the second channel of a spectrum shaped single-carrier OFDM signal after frequency conversion, and output at least two single-carrier OFDM signals.

In the embodiment of the present invention, the difference between the carrier center frequency RF2 of the second channel of a digital single-carrier OFDM signal after frequency conversion and the RF1 is an integral multiple of an MF, where the second channel of a digital single-carrier OFDM signal after frequency conversion is output by the sixth frequency mixer 675, and the MF is a lowest common multiple of the F0 and an F1, and the F1 is a lowest resolution of the carrier center frequency.

The second embodiment of the second frequency-conversion processing module 660 in the embodiment of the modulation apparatus according to the present invention may be used in the corresponding second embodiment of a method for performing frequency conversion processing on at least two channels of digital single-carrier OFDM signals respectively. It should be noted that in the embodiment of the present invention, two power amplifiers may be used to perform power amplification on the foregoing first channel of a spectrum shaped single-carrier OFDM signal after frequency conversion and second channel of a spectrum shaped single-carrier OFDM signal after frequency conversion respectively, or the first channel of a spectrum shaped single-carrier OFDM signal after frequency conversion and second channel of a spectrum shaped single-carrier OFDM signal after frequency conversion are combined by using a combiner and then a power amplifier is used to perform power amplification.

Figure 18:
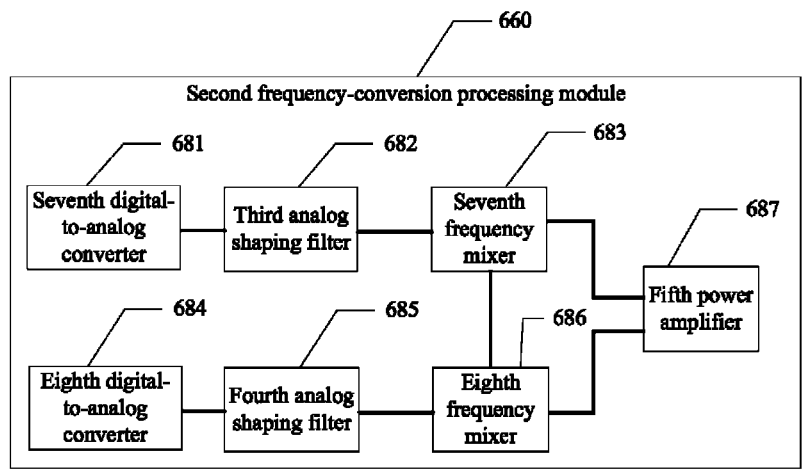
FIG. 18 is a schematic diagram of a third embodiment of a second frequency-conversion processing module in the embodiment of the modulation apparatus according to the present invention.

Referring to FIG. 18, FIG. 18 is a schematic diagram of a third embodiment of a second frequency-conversion processing module in the embodiment of the modulation apparatus according to the present invention. The second frequency-conversion processing module 660 in the embodiment of the modulation apparatus according to the present invention may include:

a seventh digital-to-analog converter 681, configured to perform digital-to-analog conversion on a first channel of a digital single-carrier OFDM signal output by a second Fourier transforming module 650, and output a first channel of an analog single-carrier OFDM signal;

a third analog shaping filter 682, configured to perform analog spectrum shaping filtering on the first channel of an analog single-carrier OFDM signal output by the seventh digital-to-analog converter 681, and output a first channel of a spectrum shaped analog single-carrier OFDM signal;

a seventh frequency mixer 683, configured to perform frequency conversion on the first channel of a spectrum shaped single-carrier OFDM signal output by the third analog shaping filter 682, and output a first channel of a spectrum shaped single-carrier OFDM signal after frequency conversion, where the carrier center frequency of the first channel of a spectrum shaped single-carrier OFDM signal after frequency conversion is an RF1;

an eighth digital-to-analog converter 684, configured to perform digital-to-analog conversion on a second channel of a digital single-carrier OFDM signal output by the second Fourier transforming module 650, and output a second channel of an analog single-carrier OFDM signal;

a fourth analog shaping filter 685, configured to perform analog spectrum shaping filtering on the second channel of an analog single-carrier OFDM signal output by the eighth digital-to-analog converter 684, and output a second channel of a spectrum shaped analog single-carrier OFDM signal;

an eighth frequency mixer 686, configured to perform frequency conversion on the second channel of a spectrum shaped single-carrier OFDM signal output by the fourth analog shaping filter 685, and output a second channel of a spectrum shaped single-carrier OFDM signal after frequency conversion, where the carrier center frequency of the second channel of a spectrum shaped single-carrier OFDM signal after frequency conversion is an RF2, and the difference between the RF2 and the RF1 is an integral multiple of an F0, and the F0 is a subcarrier bandwidth; and a fifth power amplifier 687, configured to perform power amplification on the first channel of a spectrum shaped single-carrier OFDM signal after frequency conversion and the second channel of a spectrum shaped single-carrier OFDM signal after frequency conversion, and output at least two single-carrier OFDM signals.

In the embodiment of the present invention, the difference between the carrier center frequency RF2 of the second channel of a spectrum shaped single-carrier OFDM signal after frequency conversion and the RF1 is an integral multiple of an MF, where the second channel of a spectrum shaped single-carrier OFDM signal after frequency conversion is output by the eighth frequency mixer 686, and the MF is a lowest common multiple of the F0 and an F1, and the F1 is a lowest resolution of the carrier center frequency.

The third embodiment of the second frequency-conversion processing module 660 in the embodiment of the modulation apparatus according to the present invention may be used in the corresponding third embodiment of a method for performing frequency conversion processing on at least two channels of digital single-carrier OFDM signals respectively. It should be noted that in the embodiment of the present invention, two power amplifiers may be used to perform power amplification on the foregoing first channel of a spectrum shaped single-carrier OFDM signal after frequency conversion and second channel of a spectrum shaped single-carrier OFDM signal after frequency conversion respectively, or the first channel of a spectrum shaped single-carrier OFDM signal after frequency conversion and second channel of a spectrum shaped single-carrier OFDM signal after frequency conversion are combined by using a combiner and then a power amplifier is used to perform power amplification.

The embodiment of the present invention, for example, may be used in a continuous carrier aggregation system in the LTE-A, including different combinations of 5 MHz, 10 MHz, 15 MHz, and 20 MHz. Multiple combinations may also be formed, for example, 5 MHz and 20 MHz form a 25 MHz system, or 15 MHz and 20 MHz are combined into a 35 MHz system. The embodiment of the present invention may also be applied in other communication systems. The embodiment of the present invention may also be used to split the multi-carrier OFDM signal less than or equal to 20 MHz into single-carrier OFDMs with narrower bandwidths, so as to save a guard bandwidth and improve spectrum utilization, for example, split a 20 MHz multi-carrier OFDM signal into four 5 MHz single-carrier OFDM signals.

Through the foregoing description about the embodiments, those skilled in the art may clearly understand that the present invention may be implemented by using hardware only or by using software and a necessary universal hardware platform. Based on such understandings, the technical solutions of the present invention may be embodied in the form of a software product. The software product may be stored in a nonvolatile storage medium, which may be a CD-ROM, a USB flash disk, or a removable hard disk. The software product includes several instructions that enable a computer device (for example, a personal computer, a receiver, or a network device) to execute the methods described in the embodiments of the present invention.

Detailed above are a modulation method and a modulation apparatus for implementing the method according to the present invention. Persons of ordinary skill in the art, according to the idea in the embodiments of the present invention, may make modifications and variations with respect to the implementation modes and application scopes of the present invention. Therefore, the specification shall not be construed as a limitation on the present invention.

What is claimed is:

1. A modulation method, comprising:

processing at least two data blocks to obtain at least two single-carrier Orthogonal Frequency Division Multiplex (OFDM) signals, wherein the at least two data blocks comprise a first data block and a second data block, and the at least two single-carrier OFDM signals comprise a first single-carrier OFDM signal corresponding to the first data block and a second single-carrier OFDM signal corresponding to the second data block, wherein the first single-carrier OFDM signal and the second single-carrier OFDM signal comprise subcarriers having a subcarrier bandwidth F0, and wherein a difference between a first carrier center frequency RF1 of the first single-carrier OFDM signal and a second carrier center frequency RF2 of the second single-carrier OFDM signal is an integral multiple of the subcarrier bandwidth F0; and transmitting the at least two single-carrier OFDM signals, wherein processing the at least two data blocks to obtain the at least two single-carrier OFDM signals comprises performing an inverse discrete Fourier transformation on the at least two data blocks respectively, to generate at least two channels of digital single-carrier OFDM signals, the at least two channels of digital single-carrier OFDM signals comprising at least a first channel of digital single-carrier OFDM signal(s) corresponding to the first data block and a second channel of digital single-carrier OFDM signal(s) corresponding to the second data block, wherein a first transition band W1 is used to perform digital spectrum shaping filtering on the first channel of digital single-carrier OFDM signal(s), wherein a second transition band W2 is used to perform digital spectrum shaping filtering on the second channel of digital single-carrier OFDM signal(s), and wherein at least one of the second transition band W2 and the first transition band W1 exceeds a guard bandwidth between the first channel of digital single-carrier OFDM signal(s) and the second channel of digital single-carrier OFDM signal(s).

2. The modulation method according to claim 1, wherein the difference between the first carrier center frequency RF1 of the first single-carrier OFDM signal and the second carrier center frequency RF2 of the second single-carrier OFDM signal is an integral multiple of a lowest common multiple MF of the subcarrier bandwidth F0 and a lowest resolution F1 of the first single-carrier OFDM signal.

3. The modulation method according to claim 1, wherein processing the at least two data blocks to obtain the at least two single-carrier OFDM signals comprises:
performing an inverse discrete Fourier transformation on the at least two data blocks to generate a multi-carrier OFDM signal comprising a first digital single-carrier OFDM signal corresponding to the first data block and a second digital single-carrier OFDM signal corresponding to the second data block, wherein the first digital single-carrier OFDM signal and the second digital single-carrier OFDM signal comprise subcarriers having a subcarrier bandwidth CF0, and wherein a difference between a first carrier center frequency CF1 of the first digital single-carrier OFDM signal and a second carrier center frequency CF2 of the second digital single-carrier OFDM signal is an integral multiple of the subcarrier bandwidth CF0; and
performing frequency conversion processing on the multi-carrier OFDM signal to obtain the at least two single-carrier OFDM signals.

4. The modulation method according to claim 3, wherein the difference between the first carrier center frequency CF1 of the first digital single-carrier OFDM signal and the second carrier center frequency CF2 of the second digital single-carrier OFDM signal is an integral multiple of a lowest common multiple MF between the subcarrier bandwidth CF0 and a lowest resolution F1 of the first digital single-carrier OFDM signal.

5. The modulation method according to claim 3, wherein performing frequency conversion processing on the multi-carrier OFDM signal to obtain the at least two single-carrier OFDM signals comprises:
performing digital-to-analog conversion on the multi-carrier OFDM signal to obtain an analog multi-carrier OFDM signal;
performing frequency conversion on the analog multi-carrier OFDM signal to obtain a multi-carrier OFDM signal after frequency conversion;
performing analog spectrum shaping filtering on the multi-carrier OFDM signal after frequency conversion to obtain at least two channels of spectrum shaped single-carrier OFDM signals; and
performing power amplification on the at least two channels of spectrum shaped single-carrier OFDM signals to obtain the at least two single-carrier OFDM signals.

6. The modulation method according to claim 1, wherein processing the at least two data blocks to obtain the at least two single-carrier OFDM signals comprises:
performing an inverse discrete Fourier transformation on the at least two data blocks respectively, to generate at least two channels of digital single-carrier OFDM signals; and
performing frequency conversion processing on the at least two channels of digital single-carrier OFDM signals respectively, to obtain the at least two single-carrier OFDM signals.

7. The modulation method according to claim 6, wherein performing frequency conversion processing on the at least two channels of digital single-carrier OFDM signals to obtain the at least two single-carrier OFDM signals comprises:
performing digital spectrum shaping filtering on the at least two channels of digital single-carrier OFDM signals respectively, to obtain at least two channels of digital spectrum shaped single-carrier OFDM signals; and
performing frequency conversion on the at least two channels of digital spectrum shaped single-carrier OFDM signals respectively, to obtain the at least two channels of digital single-carrier OFDM signals after frequency conversion, wherein the at least two channels of digital single-carrier OFDM signals after frequency conversion comprise a first channel of a digital single-carrier OFDM signal after frequency conversion corresponding to the first data block and a second channel of a digital single-carrier OFDM signal after frequency conversion corresponding to the second data block, wherein the first channel of the digital single-carrier OFDM signal after frequency conversion and the second channel of the digital single-carrier OFDM signal after frequency conversion comprise subcarriers having a subcarrier bandwidth CF0, and wherein a difference between a carrier center frequency CF1 of the first channel of the digital single-carrier OFDM signal after frequency conversion and a carrier center frequency CF2 of the second channel of the digital single-carrier OFDM signal after frequency conversion is an integral multiple of the subcarrier bandwidth CF0.

8. The modulation method according to claim 1, wherein a difference between the first carrier center frequency RF1 of the first single-carrier OFDM signal and the second carrier center frequency RF2 of the second single-carrier OFDM signal is equal to the subcarrier bandwidth F0.

9. A modulation apparatus, comprising:
a data processing unit, configured to process at least two data blocks to obtain at least two single-carrier Orthogonal Frequency Division Multiplex (OFDM) signals, wherein the at least two data blocks comprise a first data block and a second data block, and the at least two single-carrier OFDM signals comprise a first single-carrier OFDM signal corresponding to the first data block and a second single-carrier OFDM signal corresponding to the second data block, wherein the first single-carrier OFDM signal and the second single-carrier OFDM signal comprise subcarriers having a subcarrier bandwidth F0, and wherein a difference between a first carrier center frequency RF1 of the first single-carrier OFDM signal and a second carrier center frequency RF2 of the second single-carrier OFDM signal is an integral multiple of the subcarrier bandwidth F0; and
a transmitting unit, configured to transmit the at least two single-carrier OFDM signals output by the data processing unit, wherein the data processing unit is further configured to perform an inverse discrete Fourier transformation on the at least two data blocks respectively, to generate at least two channels of digital single-carrier OFDM signals, the at least two channels of digital single-carrier OFDM signals comprising at least a first channel of digital single-carrier OFDM signal(s) corresponding to the first data block and a second channel of digital single-carrier OFDM signal(s) corresponding to the second data block, wherein a first transition band W1 is used to perform digital spectrum shaping filtering on the first channel of digital single-carrier OFDM signal(s), wherein a second transition band W2 is used to perform digital spectrum shaping filtering on the second channel of digital single-carrier OFDM signal(s), and wherein at least one of the second transition band W2 and the first transition band W1 exceeds a guard bandwidth between the first channel of digital single-carrier OFDM signal(s) and the second channel of digital single-carrier OFDM signal(s).

10. The modulation apparatus according to claim 9, wherein the difference between the first carrier center frequency RF1 of the first single-carrier OFDM signal and the second carrier center frequency RF2 of the second single-carrier OFDM signal is an integral multiple of a lowest common multiple of the subcarrier bandwidth F0 and a lowest resolution F1 of the first carrier center frequency RF1 of the first single-carrier OFDM signal.

11. The modulation apparatus according to claim 9, wherein the data processing unit comprises:
a first Fourier transforming module, configured to perform an inverse discrete Fourier transformation on at least two data blocks to generate a multi-carrier OFDM signal, comprising a first digital single-carrier OFDM signal corresponding to the first data block and a second digital single-carrier OFDM signal corresponding to the second data block, wherein the first digital single-carrier OFDM signal and the second digital single-carrier OFDM signal comprise subcarriers having a subcarrier bandwidth CF0, and wherein a difference between a carrier center frequency CF1 of the first digital single-carrier OFDM signal and a carrier center frequency CF2 of the second digital single-carrier OFDM signal is an integral multiple of the subcarrier bandwidth CF0; and
a first frequency-conversion processing module, configured to perform frequency conversion processing on the multi-carrier OFDM signal to obtain the at least two single-carrier OFDM signals.

12. The modulation apparatus according to claim 11, wherein the data processing unit comprises:
a second Fourier transforming module, configured to perform an inverse discrete Fourier transformation on the at least two data blocks respectively, to generate at least two channels of digital single-carrier OFDM signals, wherein the at least two channels of digital single-carrier OFDM signals comprise a first channel of digital single-carrier OFDM signal(s) corresponding to the first data block and second channel of a digital single-carrier OFDM signal(s) corresponding to the second data block; and
a second frequency-conversion processing module, configured to respectively perform frequency conversion digital spectrum shaping on the at least two single-carrier OFDM signals.

13. The modulation apparatus according to claim 12, wherein the second frequency-conversion processing module comprises:

a fourth digital shaping filter, configured to perform digital spectrum shaping filtering on the first channel of digital single-carrier OFDM signal(s) to obtain a first channel of digital spectrum shaped single-carrier OFDM signal(s), wherein a transition band W1 is used to perform the digital spectrum shaping filtering on the first channel of digital single-carrier OFDM signal(s); and
a fifth digital shaping filter, configured to perform digital spectrum shaping filtering on the second channel of digital single-carrier OFDM signal(s) to obtain a second channel of digital spectrum shaped single-carrier OFDM signal(s), wherein a transition band W2 is used to perform digital spectrum shaping filtering on the first channel of digital single-carrier OFDM signal(s), wherein at least one of the transition band W2 and the transition band W1 exceeds the guard bandwidth between the first channel of digital single-carrier OFDM signal(s) and the second channel of digital single-carrier OFDM signal(s);
a fifth frequency mixer, configured to perform frequency conversion on the first channel of digital spectrum shaped single-carrier OFDM signal(s) to obtain a first channel of digital single-carrier OFDM signal(s) after frequency conversion; and
a sixth frequency mixer, configured to perform frequency conversion on the second channel of digital spectrum shaped single-carrier OFDM signal(s) to obtain a second channel of digital single-carrier OFDM signal(s) after frequency conversion, wherein the first channel of digital single-carrier OFDM signal(s) after frequency conversion and the second channel of digital single-carrier OFDM signal(s) after frequency conversion comprise subcarriers having a subcarrier bandwidth CCF0, and wherein a difference between a carrier center frequency CCF2 of the second channel of digital single-carrier OFDM signal(s) after frequency conversion and a carrier center frequency CCF1 of the first channel of digital single-carrier OFDM signal(s) after frequency conversion is an integral multiple of the subcarrier bandwidth CCF0.

14. The modulation apparatus according to claim 13, wherein the difference between the carrier center frequency CCF2 of the second channel of digital single-carrier OFDM signal(s) after frequency conversion and the carrier center frequency CCF1 of the first channel of digital single-carrier OFDM signal(s) after frequency conversion is an integral multiple of a lowest common multiple MF of the subcarrier bandwidth CCF0 and the lowest resolution F1 of the first channel of digital single-carrier OFDM signal(s) after frequency conversion.

15. The modulation apparatus according to claim 14, wherein the at least two channels of digital single-carrier OFDM signals comprise a first channel of digital single-carrier OFDM signal(s) corresponding to the first data block, and a second channel of digital single-carrier OFDM signal(s) corresponding to the second data block, wherein a transition band W1 is used to perform digital spectrum shaping filtering on the first channel of digital single-carrier OFDM signal(s), wherein a transition band W2 is used to perform digital spectrum shaping filtering on the second channel of digital single-carrier OFDM signal(s), and wherein at least one of the transition band W2 and the transition band W1 exceeds a guard bandwidth between the first channel of digital single-carrier OFDM signal(s) and the second channel of digital single-carrier OFDM signal(s).

16. The modulation apparatus according to claim 9, wherein a difference between the first carrier center frequency RF1 of the first single-carrier OFDM signal and the second carrier center frequency RF2 of the second single-carrier OFDM signal is equal to the subcarrier bandwidth F0.

17. A method comprising:
modulating data blocks to obtain a multi-carrier Orthogonal Frequency Division Multiplex (OFDM) signal, the multi-carrier OFDM signal including at least a first single-carrier OFDM signal and a second single-carrier OFDM signal, wherein the first single-carrier OFDM signal and the second single-carrier OFDM signal comprise subcarriers having a subcarrier bandwidth, and wherein a difference between center frequencies of the first single-carrier OFDM signal and the second single-carrier OFDM signal is an integral multiple of the subcarrier bandwidth; and
transmitting the at least two single-carrier OFDM signals, wherein modulating data blocks to obtain the OFDM signal comprises: performing an inverse discrete Fourier transformation on the data blocks to generate a multi-carrier digital OFDM signal, the multi-carrier digital OFDM signal including a digital single-carrier OFDM signal comprising a first channel, a second channel, and a third channel; performing digital spectrum shaping filtering on the first channel of the digital single-carrier OFDM signal in accordance with a first transition band; and performing digital spectrum shaping filtering on the second channel of the digital single-carrier OFDM signal in accordance with a second transition band, wherein at least one of the first transition band and the second transition band exceeds a guard bandwidth between the first channel of the digital single-carrier OFDM signal and the second channel of the digital single-carrier OFDM signal.

18. The method according to claim 17, wherein a difference between center frequencies of the first single-carrier OFDM signal and the second single-carrier OFDM signal is equal to the subcarrier bandwidth.

19. The method according to claim 17, wherein modulating the data blocks comprises performing an inverse discrete Fourier transformation on the data blocks to generate at least two channels of digital single-carrier OFDM signals, the at least two channels of digital single-carrier OFDM signals comprising at least a first channel of digital single-carrier OFDM signal(s) and a second channel of digital single-carrier OFDM signal(s), wherein a first transition band W1 is used to perform digital spectrum shaping filtering on the first channel of digital single-carrier OFDM signal(s), wherein a second transition band W2 is used to perform digital spectrum shaping filtering on the second channel of digital single-carrier OFDM signal(s), and wherein at least one of the second transition band W2 and the first transition band W1 exceeds a guard bandwidth between the first channel of digital single-carrier OFDM signal(s) and the second channel of digital single-carrier OFDM signal(s).

* * * * *

UNITED STATES PATENT AND TRADEMARK OFFICE
CERTIFICATE OF CORRECTION

| | | |
|---|---|---|
| PATENT NO. | : 8,743,981 B2 | Page 1 of 1 |
| APPLICATION NO. | : 13/327376 | |
| DATED | : June 3, 2014 | |
| INVENTOR(S) | : Wurong Zhang | |

It is certified that error appears in the above-identified patent and that said Letters Patent is hereby corrected as shown below:

In the Claims:

In Col. 30, lines 4-5, delete "signal (s)," and insert --signal(s)--.
In Col. 30, lines 55-56, delete "signal (s)," and insert --signal(s)--.

Signed and Sealed this
Ninth Day of September, 2014

Michelle K. Lee
*Deputy Director of the United States Patent and Trademark Office*